United States Patent
Okayama et al.

[19]

[11] Patent Number: 5,838,967
[45] Date of Patent: Nov. 17, 1998

[54] IMAGE FILING APPARATUS AND METHOD FOR STORING IMAGE DATA AND DIRECTORY INFORMATION

[75] Inventors: Tetsuhisa Okayama, Oume; Yoshiaki Aoyama, Tokyo; Hiroyuki Hoshino, Tachikawa; Hirohisa Yamaguchi, Tokyo, all of Japan

[73] Assignee: Teac Corporation, Tokyo, Japan

[21] Appl. No.: 366,008

[22] Filed: Dec. 29, 1994

Related U.S. Application Data

[63] Continuation of Ser. No. 51,071, Apr. 21, 1993, abandoned.

[30] Foreign Application Priority Data

| Apr. 23, 1992 | [JP] | Japan | 4-104876 |
| Apr. 23, 1992 | [JP] | Japan | 4-104877 |
| Apr. 23, 1992 | [JP] | Japan | 4-104878 |
| Apr. 23, 1992 | [JP] | Japan | 4-104879 |

[51] Int. Cl.$^6$ .................................................. G06F 17/30
[52] U.S. Cl. ........................ 395/616; 345/615; 345/601
[58] Field of Search .................................... 395/600, 601, 395/615, 616; 358/335, 342, 909.1; 360/33.1

[56] References Cited

U.S. PATENT DOCUMENTS

| 4,858,031 | 8/1989 | Fulcuta | 358/906 |
| 4,982,291 | 1/1991 | Kurahashi et al. | 358/906 |
| 5,027,214 | 6/1991 | Fujimori | 358/909 |
| 5,032,927 | 7/1991 | Watanabe et al. | 358/909 |
| 5,086,345 | 2/1992 | Nakane et al. | 358/906 |
| 5,122,886 | 6/1992 | Tanaka | 358/342 |
| 5,130,813 | 7/1992 | Oie et al. | 358/335 |
| 5,153,729 | 10/1992 | Saito | 358/909 |
| 5,239,382 | 8/1993 | Hatakenaka et al. | 358/906 |
| 5,550,966 | 8/1996 | Drake et al. | 395/615 |

FOREIGN PATENT DOCUMENTS

| 2-96277 | 4/1990 | Japan | G06F 15/40 |
| 2-297291 | 12/1990 | Japan | G06F 15/40 |
| 3-174661 | 7/1991 | Japan | G06F 15/40 |
| 3-240164 | 10/1991 | Japan | G06F 15/40 |
| 273451 | 12/1991 | Japan . | |
| 3-273453 | 12/1991 | Japan | G06F 15/62 |

*Primary Examiner*—Thomas G. Black
*Assistant Examiner*—Paul R. Lintz
*Attorney, Agent, or Firm*—Michael N. Meller

[57] ABSTRACT

An addition unit adds information for managing a plurality of image-data files to directory information packets. A managing unit utilizes the added information for managing the plurality of image-data files. A retrieving unit retrieves, in accordance with an input retrieving information, a desired image-data file from among the plurality of image-data files recorded on a recording medium. An image-data input and output interfacing unit interfaces for input and output of image-data files. A recording-medium interfacing unit interfaces for information input and output by means of the recording medium. An output video-signal producing unit produces a video signal for output, the producing being effected by converting the retrieved image-data file into a corresponding analog video signal and using the analog video signal as the video signal for output. A signal combining unit combines the video signal for output, the combining being executed with a retrieval video signal, the video signal for output having been output from the output video-signal producing unit, and the retrieval video signal having been obtained by converting the input retrieving information into a corresponding analog video signal then used as the retrieval video signal. A microcomputer carries out the above functions.

10 Claims, 23 Drawing Sheets

FIG. 6B

| Q VALUE (2) | TIME (2) | DATE (2) | FAT START NUMBER IMAGE (2) | FAT START NUMBER DATA (2) | FAT START NUMBER VOICE (2) | FILE DATA SIZE (4) (UNIT: CLUSTER) |

FIG. 6A

| FILE CONDITION (1) | FILE NAME (8) | EXTENSION CODE (3) | ATTRIBUTE (1) | LSI MODE (1) | INPUT VIDEO SIGNAL (1) | SAMPLE FREQUENCY (1) |

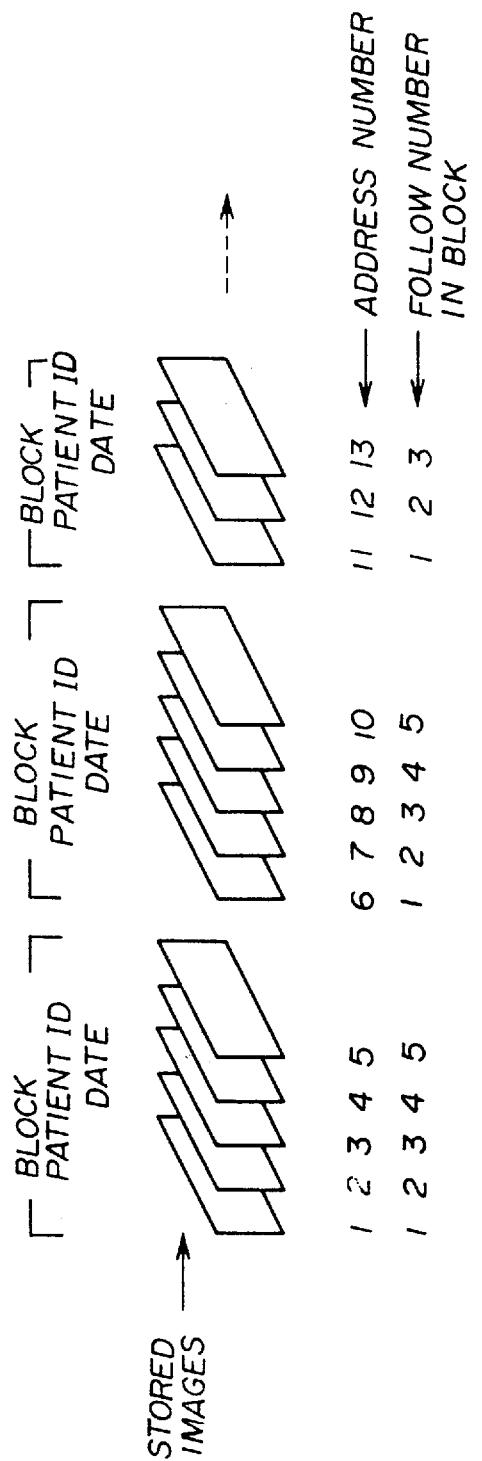

FIG. 7B

ID TABLE

| ID 1 | DIRECTORY START ADDRESS | NUMBER OF SHEETS | ID 1 | DIRECTORY START ADDRESS | NUMBER OF SHEETS | ~ | ID N | DIRECTORY START ADDRESS | NUMBER OF SHEETS |
|---|---|---|---|---|---|---|---|---|---|

FIG. 7C

DATE TABLE

| DATE 1 | DIRECTORY START ADDRESS | DIRETORY LAST ADDRESS | DATE 2 | DIRECTORY START ADDRESS | DIRECTORY LAST ADDRESS | ~ | DATE N | DIRECTORY START ADDRESS | DIRECTORY LAST ADDRESS |
|---|---|---|---|---|---|---|---|---|---|

FIG.12A

```
ID   LIST    1/1
1.   1235
2.   3455
3.   4156

:     :
```

↑ BLOCK NUMBER  ↑ ID

↑ BLOCK NUMBER  ↑ DATE  ↑ NUMBER OF SHEETS

FIG. 15A

```
DATE LIST   1/1

1   91.04.20
 2   92.01.10
 3   92.04.01
 ⋮    ⋮
 ↑    ↑
BLOCK  DATE
NUMBER
```

FIG. 15B

```
DATE  92.04.01

1   1235    10
 2   2243    11
 3   4156    10
 4   5236    15
 ↑    ↑       ↑
BLOCK  ID   NUMBER OF
NUMBER      SHEETS
```

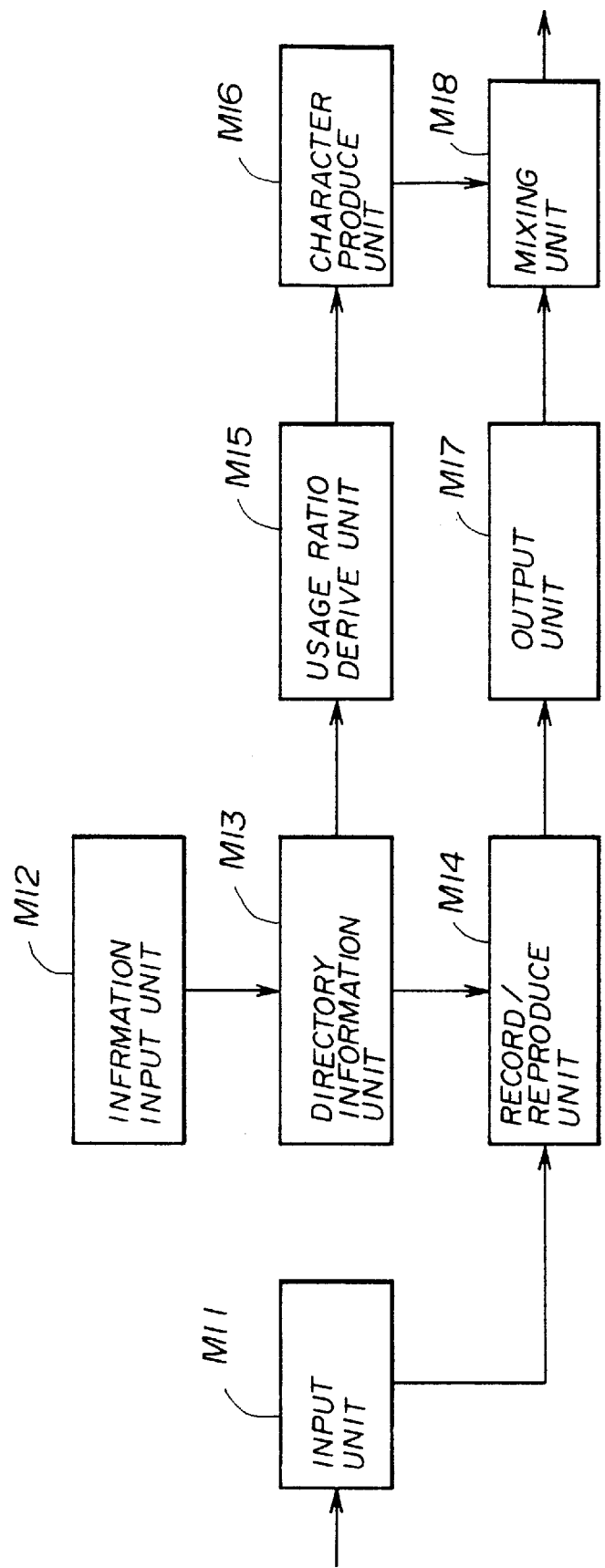

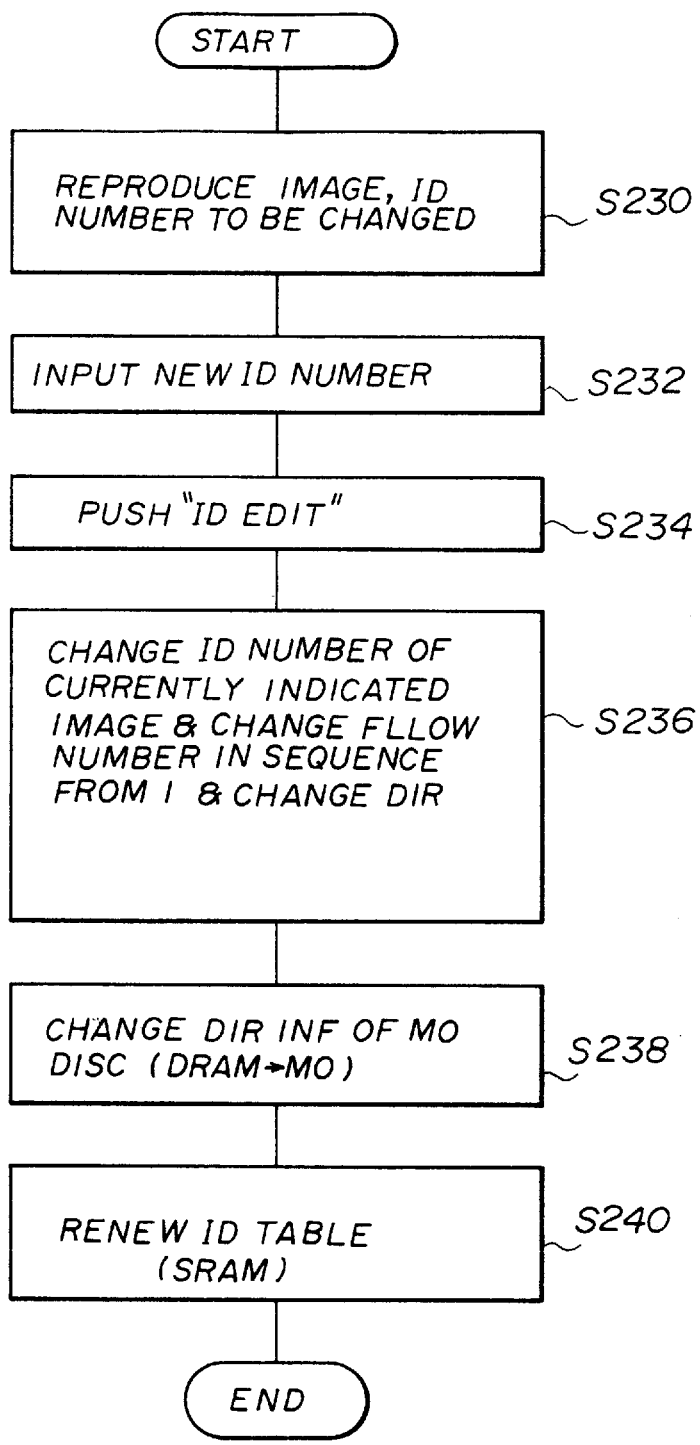

IMAGE FILING APPARATUS AND METHOD FOR STORING IMAGE DATA AND DIRECTORY INFORMATION

This application is a continuation of application Ser. No. 08/051,071, filed Apr. 21, 1993, now abandoned.

BACKGROUND OF THE INVENTION

The present invention relates to an image filing apparatus and method. An example of such an image filing apparatus files a plurality of image data files comprising image data including digital data, and the image filing apparatus retrieves a desired file of image data from among the plurality of image data files of the image data as desired, an image corresponding to the retrieved file of image data being then displayed on a displaying part of the apparatus.

The present applicant proposed an image filing system in Japanese Laid-Open Patent Application No.3-273451. This Application No.3-243451 discloses an image filing system which has functions for recording a plurality of images in an optical disc device, directory information being recorded in a database which can be processed by a personal computer. The directory information comprises at least one of: information for indicating addresses where each of the plurality of images was recorded, information for indicating a recording date and time for each image of a plurality of images, information for indicating an identification number for each image of the plurality of images, other such information if necessary. Data corresponding to a desired image is retrieved from the database and information indicating an address where the desired image was recorded is obtained by means of the retrieved data. The desired image is then reproduced from the optical disc device, the address of the desired image being stated in the retrieved data.

The above disclosed image filing system comprising two separate identical devices, the optical disc device for recording/reproducing images and the personal computer for managing the directory information, is thus a complex system. Further, the above system uses two separate display means, a character display for indicating the directory information for retrieving the desired image, and a monitor for displaying the retrieved image; the indicating function being effected using two screens results in inefficiency of operation.

SUMMARY OF THE INVENTION

An object of the present invention is to provide an image filing apparatus and method for recording image data and corresponding directory data in a common device, the apparatus and method being simple in constitution. Further, the image filing apparatus and method indicate the retrieved image and input retrieving information used in the retrieval of the desired image data by means of the corresponding directory information on the common screen, thus resulting in an improvement in operation efficiency.

To achieve the above object, the image filing apparatus according to the present invention comprises:

addition means for adding information for managing a plurality of image-data files to directory information packets;

managing means for utilizing the added information for managing the plurality of image-data files;

retrieving means for retrieving, in accordance with an input retrieving information, a desired image-data file from among the plurality of image-data files recorded on a recording medium;

image-data input and output interfacing means for interfacing for input and output of image-data files of the plurality of image-data files;

recording-medium interfacing means for interfacing for information input and output by means of the recording medium;

output video-signal producing means for producing an output video signal by converting the retrieved image-data file into a corresponding analog video signal then used as an output video signal; and signal combining means for combining an output video signal with a retrieving video signal, the output video signal having been output from the output video-signal producing unit, and the retrieving video signal having been obtained by converting the input retrieving information into a corresponding analog video signal then used as the retrieving video signal; and wherein a microcomputer carries out the above functions.

Other objects and further features of the present invention will become more apparent from the following detailed description when read in conjunction with the accompanying drawings.

BRIEF DESCRIPTION OF THE DRAWINGS

FIGS. 6A through 6D show formats for writing directory information in the image filing apparatus according to the first through fourth embodiments of the present invention;

FIG. 7A illustrates blocks of recorded images in the image filing apparatus according to the first through fourth embodiments of the present invention;

FIGS. 7B and 7C illustrate an ID table and a date table respectively in the image filing apparatus according to the first through fourth embodiments of the present invention;

FIGS. 12A and 12B show display screens at times of the ID list retrieval process in the image filing apparatus according to the second through fourth embodiments of the present invention;

FIGS. 15A and 15B show display screens at times of the date list retrieval process in the image filing apparatus according to the second through fourth embodiments of the present invention;

FIG. 16 shows a block diagram of the image filing apparatus according to the third embodiment of the present invention;

FIG. 21 shows an operation flow of a renumbering process in the image filing apparatus according to the fourth embodiment of the present invention.

DESCRIPTION OF THE PREFERRED EMBODIMENTS

Figure 2:
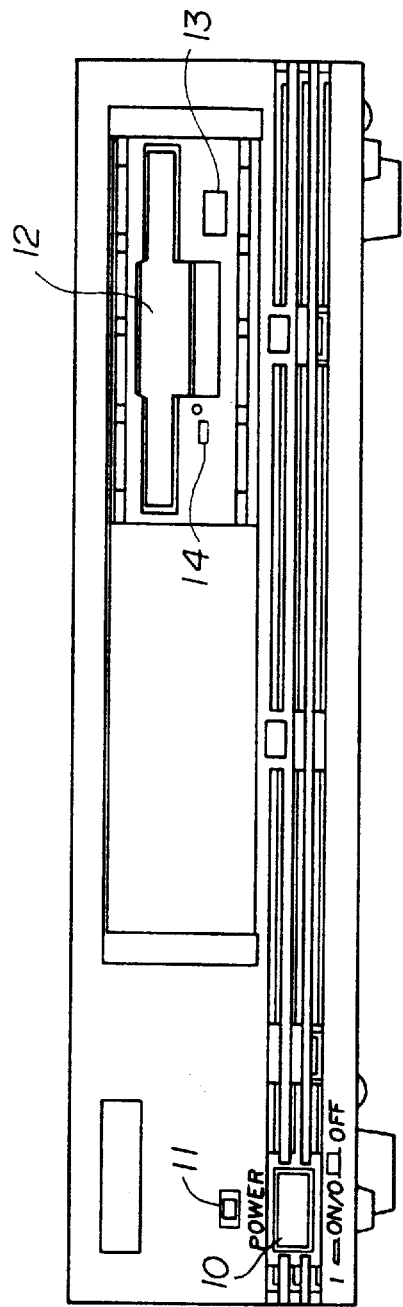
FIG. 2 shows a front view of the image filing apparatus according to the first through fourth embodiments of the present invention.

In FIG. 2, a front surface of the image filing apparatus according to the first through fourth embodiments of the present invention has: a power switch 10, a power indicator LED (light emission diode) 11 which is lit when power is being provided to the image filing apparatus, a disc inserting opening 12 through which a 3.5-inch MO (magneto-optical) disc may be inserted into the image filing apparatus, an ejecting button 13 which may be pressed to eject the MO disc, and disc drive LED 14 which is lit when an MO disc drive is operating.

Figure 3:
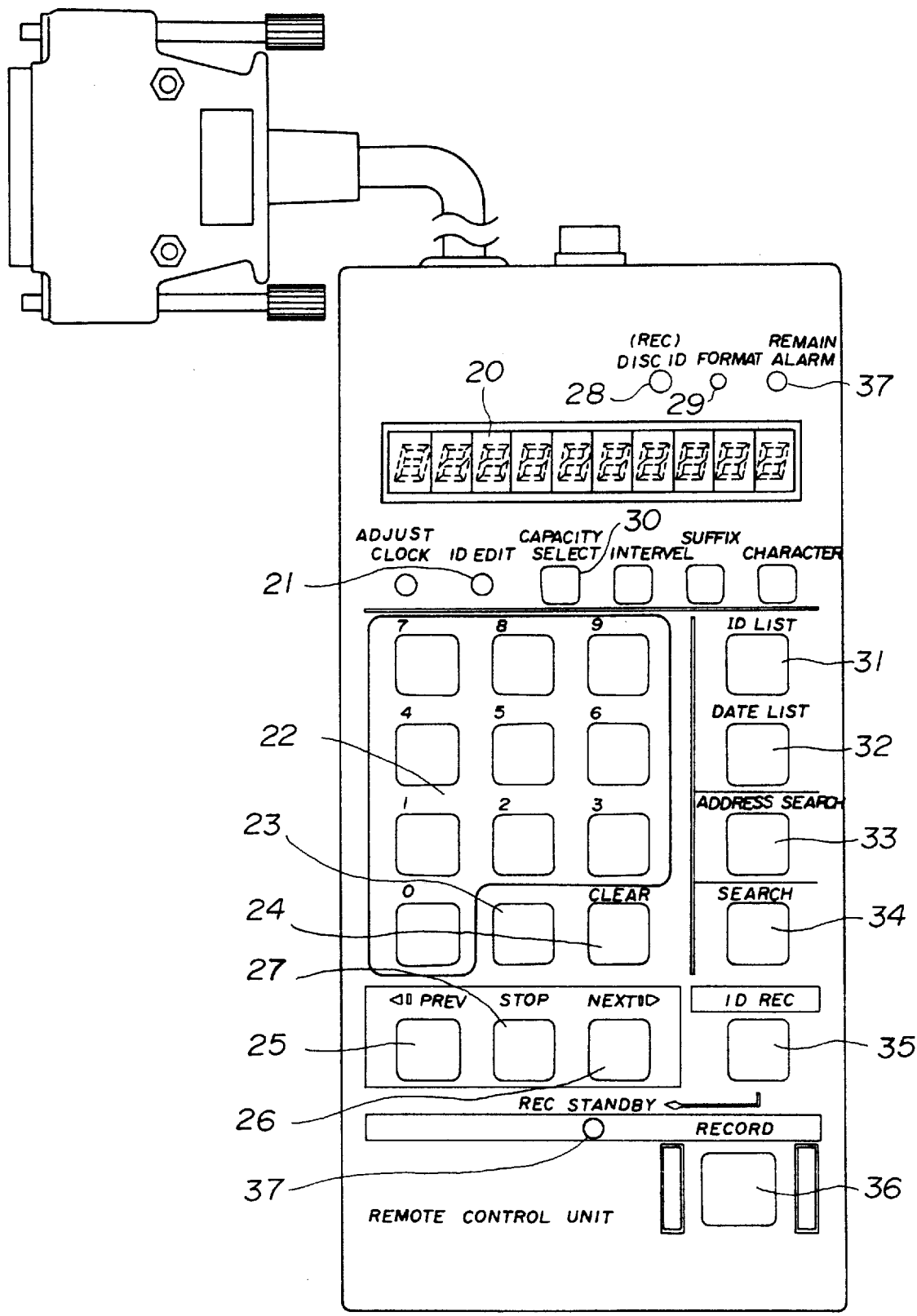
FIG. 3 shows an operation surface of a remote control unit of the image filing apparatus according to the first through fourth embodiments of the present invention.

In FIG. 3, an operation surface of a remote control unit of the image filing apparatus according to the first through fourth embodiments of the present invention has: a 10-figure display unit 20, an ID EDIT key 21 for inputting patient ID (identification numbers) and for changing "follow numbers" of the patient ID, a ten-key keyboard 22 for inputting numbers, a hyphen key 23, a clear key 24 for clearing input (including, for example, information input by means of the ten-key keyboard 22), a "previous" key 25 and a next key 26 for causing display of reproduced images (display of the reproduced images being executed by both keys, the display of the images being successively changed back or forward respectively), a stop key 27 for stopping a recording operation or stopping a reproducing operation, a disc ID key 28 for recording or causing display of a disc ID, a formatting key 29 for formatting an MO disc, a capacity-selection key 30 for causing display of or variably setting a compression rate of a compression mode, an ID list key 31 for causing display of a patient ID list, a date list key 32 for indicating a date list, an address search key 33 for searching directly for an image in accordance with a given address number, a search key 34 for directly searching for a reproduced image in accordance with the patient ID, an ID storing key 35 for storing patient ID, and a storing key 36 for starting a storing operation.

The operation surface of the remote control unit further has: a low remaining capacity alarm indicator LED 37 which is lit when a usage ratio of recorded data in the disc has reached 90% by recording data, and a recording stand-by indicator LED 38 which is lit in a state where a recording operation can be started.

Figure 4:
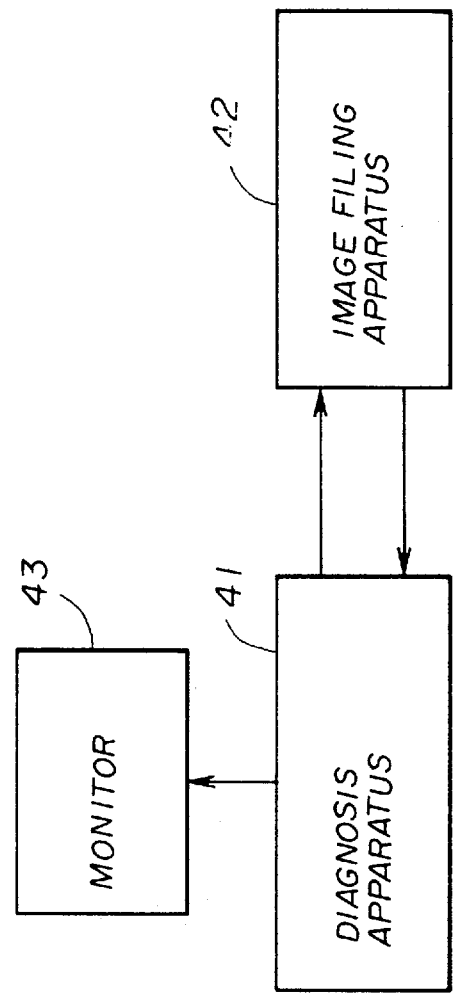
FIG. 4 shows a block diagram of a system applying the image filing apparatus according to the first through fourth embodiments of the present invention.

The above-mentioned image filing apparatus 42 is applicable to a system of FIG. 4. In the system, video signals output by a diagnosis apparatus 41 which can be, for example, a supersonic-wave diagnosis apparatus are provided to the image filing apparatus 42. Further, video signals output by the image filing apparatus 42 are provided to the diagnosis apparatus 41 and images corresponding to the provided video signals are then displayed on a monitor 43.

Figure 1:
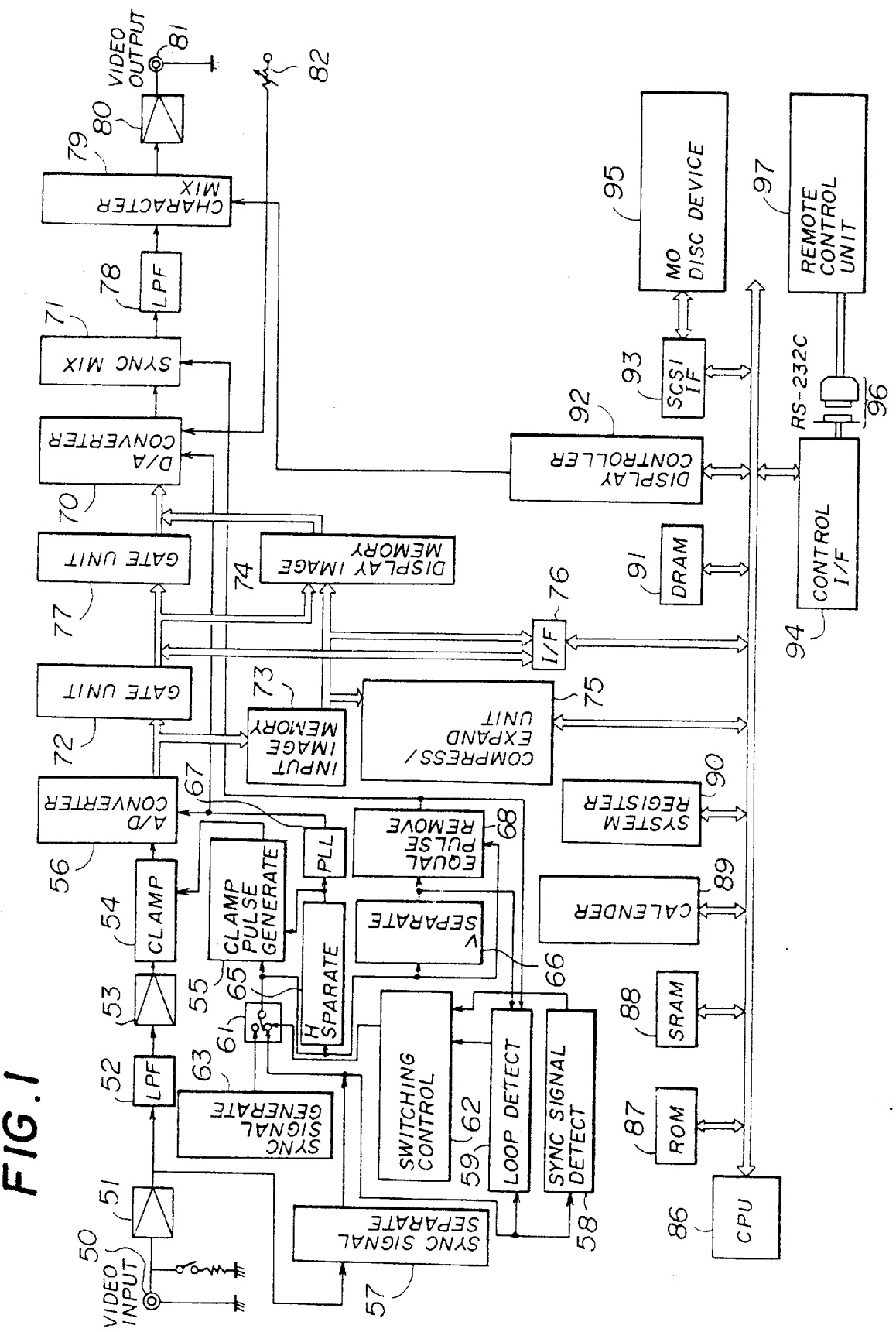
FIG. 1 shows a block diagram of an image filing apparatus according to a first through a fourth embodiments of the present invention.

A block diagram of the image filing apparatus 42 according to the first through fourth embodiments of the present invention will now be described with reference to FIG. 1. A combined video signal is input from the diagnosis apparatus 41 through a terminal 50. The input signal is then amplified by the amplifier 51. Undesired high-frequency components of the signal amplified by the amplifier 51 are removed by a low pass filter 52. The signal output from the filter 52 is input to a clamping unit 54 via an amplifier 53. A pedestal level of the input signal is then clamped to a predetermined voltage by the clamping unit 54, the clamping being carried out by means of clamp pulses output by a clamping pulse generating unit 55. The signal output from the clamping unit 54 is then input to an A/D converter 56 and is thereby converted from an analog signal of the input signal to a digital signal.

The combined video signal output from the amplifier 51 is also input to a synchronization signal separating unit 57 and the combined synchronization signal thus separated from the input signal is then input to a synchronization signal detecting unit 58, a loop detecting unit 59 and a switch 61. The synchronization signal detecting unit 58 generates a synchronization detection signal when the unit 58 detects the combined synchronization signal. The combined video signal output by the image filing apparatus 41 is first processed by a below-described equalizing pulse removing unit 68 so that, before outputting the combined video signal, an equalizing pulse is removed from the middle of the eighth horizontal scanning period (8H period) counting from a starting position of a vertical synchronization signal. The loop detecting unit 59 compares the combined synchronization signal which is output by the synchronization signal separating unit 57 with the combined synchronization signal which is output by the equalizing pulse removing unit 68. The loop detecting unit 59 then generates a loop detected signal if the unit 59 detects that the above equalizing pulse was removed, which equalizing pulse should be located in a middle position of the above 8H period of the vertical synchronization signal. This detection of removal of the equalizing pulse indicates that the video signal output by the image filing apparatus 41 is again being input through the terminal 50 so that the signal flow currently forms a loop undesirably. The loop detection signal output by the loop detecting unit 59 is then input to a switching control unit 62. (Details of the loop detecting unit 59 are disclosed in Japanese Patent Application No.4-104880 which was filed by the present applicant.)

In a case where the synchronization detection signal output by the synchronization signal detecting unit 58 is input to the switching unit 62 and further the loop detecting unit 59 does not output the loop detection signal, the switching unit 62 causes the switch 61 to select the combined synchronization signal output by the synchronization signal separation unit 57. The unit 62 causes the switch 61 to select the combined synchronization signal output by the synchronization signal generating unit 63 in a case other than the above case.

The combined synchronization signal selected by the switch 61 is then input to the clamping pulse generating unit 55, a horizontal synchronization signal separation unit 65, a vertical synchronization signal separation unit 66, the equalizing pulse removing unit 68, respectively. The clamping pulse generating unit 55 generates the clamping pulse and then outputs it to the clamping unit 54, the generation of the clamping pulse being synchronized with the horizontal synchronization signal output from the horizontal synchronization signal separation unit 65. The horizontal synchronization signal separation unit 65 separates the horizontal synchronization signal from the combined synchronization signal and the separated horizontal synchronization signal is then input to the clamping pulse generating unit 55 and a PLL (phase locked loop) unit 67. The PLL unit 67 generates sampling pulses synchronized with the horizontal synchronization signal and the unit 67 inputs the sampling pulses to an A/D converter 56 and a D/A converter 70.

The vertical synchronization signal separation unit 66 separates the vertical synchronization signal from the combined synchronization signal and further generates a timing signal which indicates the above eighth horizontal scanning period (8H period) of the vertical synchronization signal. The timing signal is then input to the loop detecting unit 59 and the equalizing pulse removing unit 68. The equalizing pulse removing unit 68 removes and then deletes an equalizing pulse located in the middle of the 8H period. The unit 68 further modifies an equalizing pulse located in a starting position of the 8H period so as to cause the equalizing pulse to become a pulse having a pulse width approximately the same as pulse widths of pulses of the normal horizontal synchronization signal, which pulse width of the equalizing pulse of the starting position is twice the pulse width of the equalizing pulse. The modified pulse located at the starting position of the 8H period of the vertical synchronization signal is then input to the synchronization signal mixing unit 71.

The A/D converter 56 converts the input analog signal into a digital signal of image data, which digital data output by the A/D converter 56 is then input to a gate unit 72, an input image memory 73 and an display image memory 74, respectively. Image data read from the input image memory 73 is then input to the display image memory 74, a compression/expansion unit 75, and an image data interface unit 76. Image data output from either the gate unit 72, the compression/expansion unit 75, or the image data interface unit 76 is then input to the display image memory 74 and the gate unit 77. Image data output from either the display image memory 74 or the gate unit 77 is then input to the D/A converter 70.

The D/A converter 70 converts image data input thereto into an analog video signal. The output analog video signal is then input to the synchronization signal mixing unit 71 whereby the input video signal is added to and mixed with the combined synchronization signal output from the equalizing pulse removing unit 68, a combined video signal being thus obtained. Undesired high-frequency components in the obtained combined video signal are then removed by the low pass filter 78. The character mixing unit 79 then mixes a character display signal with a signal output by the low pass filter 78, the character display signal is used for a superimposing operation. A signal output by the character mixing unit 79 is amplified by an amplifier 80, and then output through a terminal 81. A variable resistor 82 is used for adjusting the thresholding level of the D/A converter 70 so as to adjust an output signal level of the video signal.

The compression/expansion unit 75 performs image compression and image expansion operations in accordance with the JPEG (Joint Photographic Experts Group standard, that is, an international standardizing group; the standard corresponds to ISO 10918-1).

The compression/expansion unit 75 and the image data interface unit 76 are connected to a bus 85 so as to send data to and receive data from the bus 85. Other units are also connected the bus 85 so as to send data to and receive data from the bus 85, the other units including a CPU 86, a ROM 87, a static RAM (SRAM) 88, a calender (timer) unit 89, a system register 90 which is used for latching a control signal to be output outside the image filing apparatus 41, a dynamic RAM (DRAM) 91, a display controller 92, a SCSI interface unit 93, and a control interface unit 94. An MO disc device 95 is connected to the interface unit 93, and the remote control unit 97 is connected to the control interface unit 94 via an RS-232C interface unit 96.

A disc format of the MO disc device 95 will now be described with reference to FIG. 5. 25 sectors located at the top of the disc format are allocated for 13 sectors of volume managing information and 12 sectors of disc ID. Another 25 sectors located at the bottom of the disc format are allocated for another 13 sectors of volume managing information and another 12 sectors of disc ID. 256 sectors which follow the top 25 sectors are allocated for a file allocation table (FAT) and another 256 sectors which follow the above 256 sectors allocated to the FAT are allocated to a spare FAT.

Sectors remaining in the disc format are allocated for a data area. The data area includes 625 sectors for storing directory information packets, these sectors following the sectors for the spare FAT; and another 625 sectors allocated for a spare storing capacity for directory information packets, these sectors following the sectors allocated for the directory information packets. Information files, including image files, data files or voice files, are stored in sectors remaining thereafter and before the bottom side sectors allocated for the volume managing information in the disc format.

An initial identification code comprising 8 characters is stored in a sector of the sectors allocated for the volume managing information, and initial identification codes each identical to the above initial identification code are stored in the other sectors, that is in sectors corresponding to spares. A disc identification number comprising 6 figures is stored in a sector of the sectors allocated to the disc ID, and disc identification numbers each identical to the above disc identification number are stored in the other sectors, that is in sectors corresponding to spares.

The FAT indicates conditions of clusters constituting the data area, the FAT indicates how each of the clusters is used for storing the files and each of the clusters comprises 4K bytes. In the FAT, codes are used to indicate the conditions of the clusters. The codes used in the FAT include codes that can be expressed by 0000 (H), 0002 (H) through FFF6 (H), FFF7 (H) and FFF8 (H) through FFFF (H) in the hexadecimal numbering system ("(H)" means a number stated before "(H)" is expressed in the hexadecimal numbering system, hereinafter). The code 0000 (H) indicates that the corresponding cluster has not been used yet. Each of the codes 0002 (H) through FFF6 (H) indicates that the corresponding cluster having the corresponding code is being used as one of the clusters constituting the file, each code further indicates a cluster number of cluster following the current cluster in the file. The code FFF7 (H) indicates a damaged cluster. Each of the codes FFF8 (H) through FFFF (H) indicates that the cluster having the code is the last cluster of the file. In an example of storing a file of monochrome non-compressed image data, 117 clusters are used for storing of the file.

A directory information packet is provided for each image file and 64 bytes are assigned for each directory information packet. Formats of the directory information packet will now be described with reference to FIGS. 6A through 6D. A first byte in FIG. 6A indicates a condition of the file, that is, it indicates how the file is currently used. A code 00 (H) in this byte indicates the file is not used, a code FF (H) in the byte indicates that the file is used, and a code E5 (H) in the byte indicates that the file has been temporarily deleted. The following 8 bytes indicate the file name by an address number written therein, the address number comprising a maximum of 8 bytes. When the address number comprises a number of bytes less than 8, the bytes should be written so as to start from the first byte of the 8 bytes. The following 3 bytes indicate extension codes which indicate whether or not image information, data information, and/or voice information is included in the file.

A following byte indicates an attribute, this byte having respective bits indicating whether the file comprises a read only file, a secret file, subdirectory information, or a table-of-contents file. Remaining bits of the above byte indicate whether an image storing mode of the file is preset to be a large capacity mode (high compression mode), a standard mode (standard compression mode), a semi-high-resolution mode (low compression mode), or a non-compression mode. A following byte indicates an LSI mode which indicates a type of an integrated circuit being used as the compression/expansion unit 75. A following byte indicates information of an input video signal, respective bits of this byte indicating whether an input video signal stored in the image file comprises a combined monochrome signal, a combined color signal, a YC separation color signal, a component color signal, a YUV color signal, or a RGB color signal. A following byte indicates information concerning a sampling frequency, respective bits of this byte indicating a sampling ratio of a monochrome signal or a signal of various types of color signals in the compression/expansion unit 75. Examples of the sampling ratios mentioned above comprise Y:U:V=4:2:1, or R:G:B=4:4:4.

The following 2 bytes (FIG. 6B) indicate a Q value which value determines a compression rate in the compression/expansion unit 75. The following 2 bytes indicate information of time, that is, the time: hours, minutes, and seconds when the file was written. The following 2 bytes indicate information of date, that is, year, month, and date when the file was written. The following 2 bytes indicate information concerning the FAT starting number of an image, that is, information concerning a FAT number (address) corresponding to a cluster beginning at which image information is written. The following 2 bytes indicate information concerning a FAT data starting number, that is, a FAT number (address) corresponding to a cluster from which data information is written in the file. The following 2 bytes indicate information of a FAT voice starting number, that is, information concerning a FAT number (address) corresponding to a cluster from which voice information was written in the file. The following 4 bytes indicate information concerning of a file size, that is, a number of clusters used for storing the file.

Figure 6C:
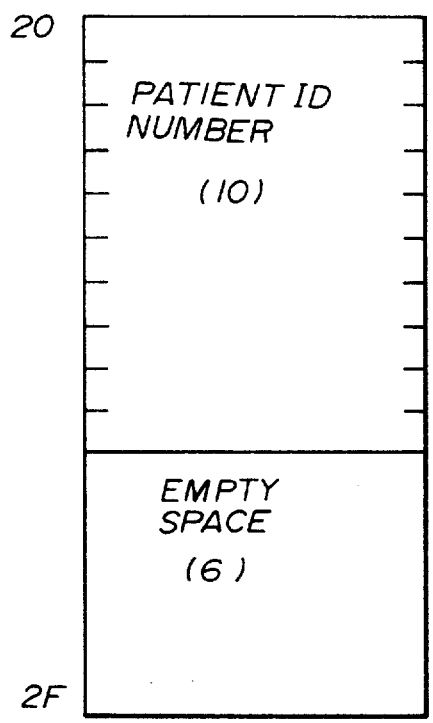
Figure 6D:
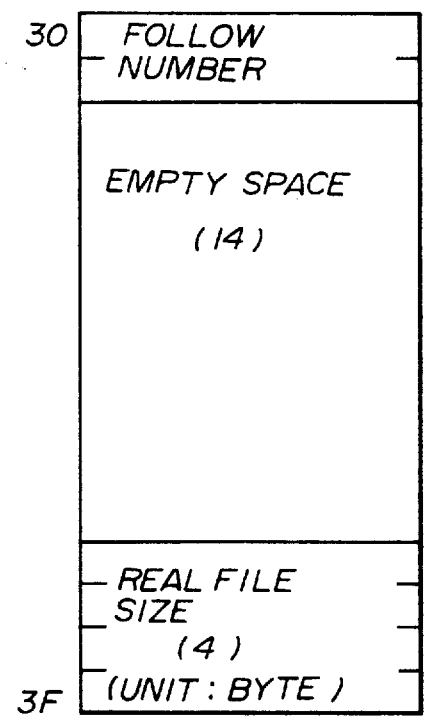

The following 10 bytes in FIG. 6C indicate a patient ID (identification) number using a 10 figure number. The following 10 bytes comprise empty spaces. The following 2 bytes in FIG. 6D indicate a "follow number", that is, in a case where a plurality of files are made for one diagnosis of one patient, successive numbers are assigned to respective files of the plurality of files and each of the successive numbers is written as the "follow number". The following 14 bytes comprise empty spaces. The following 4 bytes indicate a "real file size", that is, a number of bytes used for storing the file.

When the MO disc is loaded in the MO disc device 95 and the loading is reported to the CPU 86, the CPU 86 reads the directory information packets stored in the MO disc and stores the packets in the DRAM 91.

Before information concerning a patient is allowed to be stored in the MO disc, an operator has to input an ID of for example of a patient which ID is to be stored (Hereinafter, the example, where patient IDs are concerned will be used); the input effected by operating of the ten-key keyboard 22 of the remote control unit 97, and the operator then has to press the ID storing key 35. Further, the operator has to press the capacity selecting key 30 so as to select the capacity mode, that is, to select one of the modes, either the large capacity mode (mode 4), the standard mode (mode 3), the semi-high-resolution mode (mode 2), or the non-compression mode (mode 1), and the operator has to then press the storing key 36.

After the above operation by the operator, the CPU 86 causes the monitor 43 to display information concerning the input patient ID and the selected capacity mode, using the corresponding characters (letters), by producing a character video signal of the information and inputting the signal to the character mixing unit 79. Such a display of information using characters is carried out also when the below-described retrieval operations are executed.

As a result of the above operation by the operator, the CPU 86 controls the following operations. Image data is read from the input image memory 73. The read image data is then either passed through the image interface unit 76 or is compressed by the compression/expansion unit 75. The image data is then passed through the bus 85 so as to be sent to the DRAM 91 and the image data is then written in the DRAM 91. Further, the CPU 86 searches the directory information packets stored in the DRAM 91 so as to find a directory information packet, which directory information packet corresponds to a file that has not been used. This finding is executed by reading data stated as "the file condition" of FIG. 6A. Then the CPU 86 writes respective items into spaces, starting from the "file name" area and ending with the "real file size" area, of the found directory information packet, and sets the code FF (H) (the code indicating the corresponding file is used) in the bytes of the "file condition" area of FIG. 6A. Then, the CPU 86 reads the image data and the directory information packet from the DRAM 91 so as to transfer them to the MO disc device 95 and so as to write them in the MO disc.

By repeating the above storing processes, a plurality of image sheets shown in FIG. 7A are stored in the MO disc of the MO disc device 95. Address numbers of the files are written in the directory information packets corresponding to the files so that the address numbers increment in accordance with progression of the sequence in which the files are stored in the MO disc, the files corresponding to the plurality of image sheets. Files of the images, which files have been stored in the MO disc successively at a common date, are determined to constitute a date block. Files of the images, which files have been stored in the MO disc successively at a common date and which files have a common patient ID, are determined to constitute a block, a kind of the block being other than that of the above date block. In each block, the "follow numbers" (FIG. 6D) are written in the directory information packets of the corresponding files of images; the "follow numbers" written in the directory information packets increase starting from 1, in accordance with progression of the sequence in which the files are stored in the MO disc.

The CPU 86 produces in the SRAM 88 an ID table as shown in FIG. 7B and a date table as shown in FIG. 7C both for use in retrieving the files. Each table element of the ID table is provided for a respective one of the blocks. A starting address, in the DRAM 91, of the directory information having the "follow number" of 1, is stated in the table element. (The starting address will hereinafter be called "directory starting address".) A number of image sheets comprising files that have images included in the corresponding block, is also stated in the each element. Thus, files of images having a common patient ID and having been written in the MO disc at different dates result in a plurality of table elements in the ID table. In this case, the table elements in the ID table are arranged in a sequence of the writing dates from most recent to least recent dates.

A table element in the date table of FIG. 7C is provided for each written date. (One table element corresponds to each date block.) The table element comprises: a starting address, in the DRAM 91, of the directory information packet of a first file written first among the files written in the common date (the above starting address will be called the "directory starting address"); and another starting address, in the DRAM 91, of the directory information packet of a last file written last among the files written in the common date (the above last written starting address will be called the "directory last address"). The table elements of the date table are arranged in the sequence of the written dates from an least recent to a most recent date.

Retrieval operations in the image filing apparatus according to the first through fourth embodiments of the present invention will now be described. The retrieval operations comprise three kinds of retrieval operations. In the first kind of retrieval operation, namely, a direct retrieval operation, the operator inputs, by means of the ten-key keyboard 22 of the remote control unit 97, the address number of the file to be retrieved and then the operator presses the address search key 33. The CPU 86 thus searches the directory information packets of the DRAM 91 so as to retrieve the directory information packet having an address number identical to the input address number. The CPU 86 then reads image data of the file from the MO disc of the MO disc device 95, the reading starting with the FAT starting number of an image and the reading continuing correspondingly to the file data size of the found directory information packet. The CPU 86 then stores the read image data in the DRAM 91. Then, the stored image data is read from the DRAM 91 and is written in the display image memory 74 after passing through the image data interface unit 76 and being expanded by the compression/expansion unit 75 at an expansion rate according to the attribute stated in the directory information packet. The written image data is then read from the display image memory 74 and is converted into analog data by the D/A converter 70 so as to become the combined video signal. The obtained combined video signal is then output via the terminal 81 and caused display on the monitor 43.

In the second kind of retrieval operation, namely, an ID list retrieval operation, the patient ID is input by means of the ten-key keyboard 22 and the ID list key 31. The CPU 86 thus searches the ID table stored in the SRAM 88 for all the table elements corresponding the input patient ID. The CPU 86 then directs the display controller 92 so as to cause display, for each table element, of the dates of the directory information packets, which packets are read starting with the directory starting addresses stated in the retrieved table elements and, for each table element, to cause display of the "number of sheets" (FIG. 7B) stated in each of the retrieved table elements. The display controller 92 then generates the character video signal for causing display of characters (letters) comprising the input patient ID and a list of block numbers (the block numbers having been assigned to the respective blocks so that the block numbers comprise successive numbers) corresponding to retrieved table elements, a list of dates, and a list numbers each comprising a "number of sheets" for each block number. The generated character video signal is then input to the character mixing unit 79 so that the unit 79 causes the monitor 43 to cause display of the lists.

The operator may select a desired block number from among the block numbers in the displayed list after examining the displayed lists. The selected block number can be input by means of the ten-key keyboard 22 and the search key 34 is then to be pressed. Thus, the CPU 86 searches the DRAM 91 for directory information packets starting with directory starting addresses stated in the table elements of the ID table, which table elements are determined in accordance with the input block number. The CPU then reads, from the MO disc of the MO disc device 95, the image data of files with the corresponding "FAT starting numbers of images" and continuing corresponding to the corresponding "file data sizes" (FIG. 6B) of the retrieved directory information packets. The CPU then writes the read image data into the DRAM 91. The written image data is then read and made to pass through the image data interface unit 76 so as to input the read image data to the compression/expansion unit 75. The compression/expansion unit 75 then expands the input image data with an expansion rate according to the attribute stated in the directory information packets. The expanded image data is then written into the display image memory 74. The written image data is then read and converted into analog data by means of the D/A converter 70 so as to be used as the combined video signal. This obtained combined video signal is then output via the terminal 81 and caused display on the monitor 43.

In the third kind of retrieval operation, namely, a date list retrieval operation, a date is input by means of the ten-key keyboard 22 and the date list key 32; in this operation image data concerning the date to be retrieved. The CPU 86 thus searches the date table stored in the SRAM 88 for table elements having dates identical to the input date. The CPU 86 then searches the DRAM 91 for the directory information packets starting with the directory starting addresses and ending with the directory last addresses stated in the retrieved table elements. The CPU 86 then reads all the patient ID numbers stated in the directory information packets comprising "follow numbers 1", that is, the CPU reads the patient ID numbers concerning the first directory information packets in each block. The CPU 86 then directs the display controller 92 to cause display of all the read patient ID numbers. The display controller 92 thus generates a character video signal for causing display of the characters which express a list of all the block numbers (the successive numbers) corresponding to blocks in which the retrieved directory information packets are included and a list of all the read patient ID numbers, in addition to the input date. The obtained character video signal is used for causing display of the lists on the monitor 43.

After examining the displayed lists, the operator may select a desired patient ID number and may input the corresponding block number by means of the ten-key keyboard 22; the search key 34 is then to be pressed. The CPU 86 thus searches the DRAM 91 for directory information packets in accordance with the input date and the input block number corresponding to the selected patient ID number. The CPU then reads, from the MO disc of the MO disc device 95, the image data of the files starting with the corresponding "FAT starting numbers of images" and continuing correspondingly to the "file data sizes" of the retrieved directory information packets. The CPU then writes the read image data to the DRAM 91.

The written image data is then read and passed through the image data interface unit 76 so as to be input to the compression/expansion unit 75. The compression/expansion unit 75 then expands the input image data within an expansion rate according to the attribute stated in the directory information packets and the expanded image data is then written in the display image memory 74. The written image data is then read from the display image memory 74 and converted into analog data by means of the D/A converter 70 so as to be used as the combined video signal. This obtained combined video signal is then output via the terminal 81 and is displayed on the monitor 43.

In the image filing apparatus according to the first through fourth embodiments of the present invention, the files of image data and the directory information packets are stored in the common MO disc of the MO disc device 95. Further, the system processing the files of image data and the system processing the directory information packets are integrated into a common system. Thus the constitution of the apparatus is simplified.

Further, storing of the directory information packets in the DRAM 91 results in speedy retrieval operations by eliminating reading of the corresponding directory information packets from the MO disc of the MO disc device 95.

Figure 5:
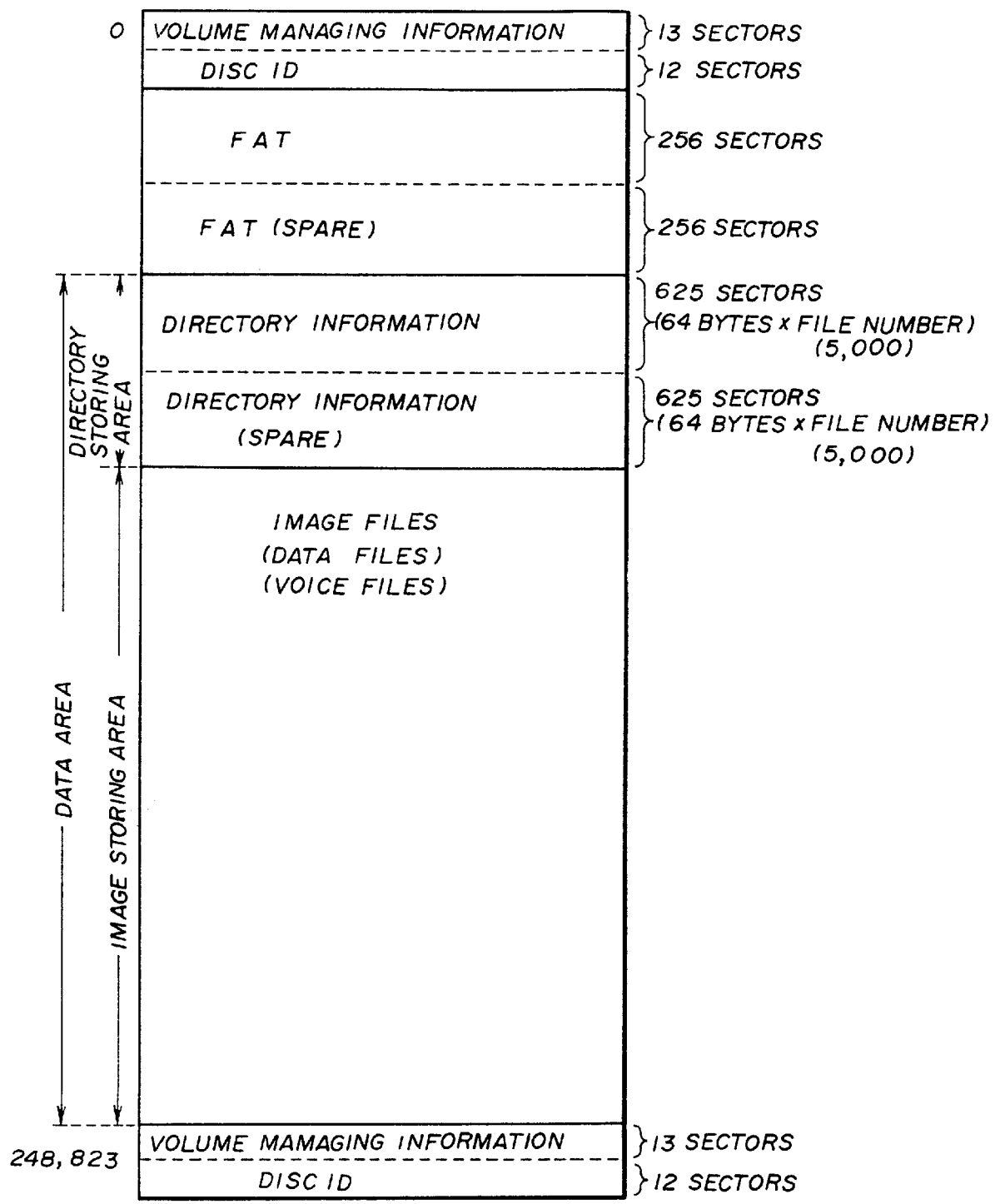
FIG. 5 shows a format of an MO (magneto optic) disc employed by the image filing apparatus according to the first through fourth embodiments of the present invention.

Furthermore, causing display, on the common screen, of information other than the image of the retrieved file stored in the image storing area of the disc format as in FIG. 5 results in an improvement of efficiency of the operation by the operator because the operator has not to change screens in retrieval operations, the above other information including input information including the input patient ID number, the ID table and the date table.

The image filing apparatus according to the second through fourth embodiments of the present invention will now be described.

The image filing apparatus according to the second through fourth embodiments is further useful for solving the following problem. In an example of utilizing an image filing apparatus, a diagnosis using a supersonic diagnosis apparatus results in recording, for example, several image sheets for a patient. In this case, because no relationship is made between the several image sheets and a status wherein the images were recorded in a database, a retrieval operation thereof may be troublesome, the retrieval operation being effected to retrieve the several image sheets from among all image sheets recorded in the database, all the image sheets in the database comprising many image sheets other than images corresponding to the several image sheets to be retrieved. Particularly, in a case where identification (ID) numbers or date and times when the several image sheets to be retrieved were recorded are not given, the retrieval operation may be troublesome because it is needed to retrieve the directory information packets corresponding to all the image sheets recorded in the database.

Figure 8:
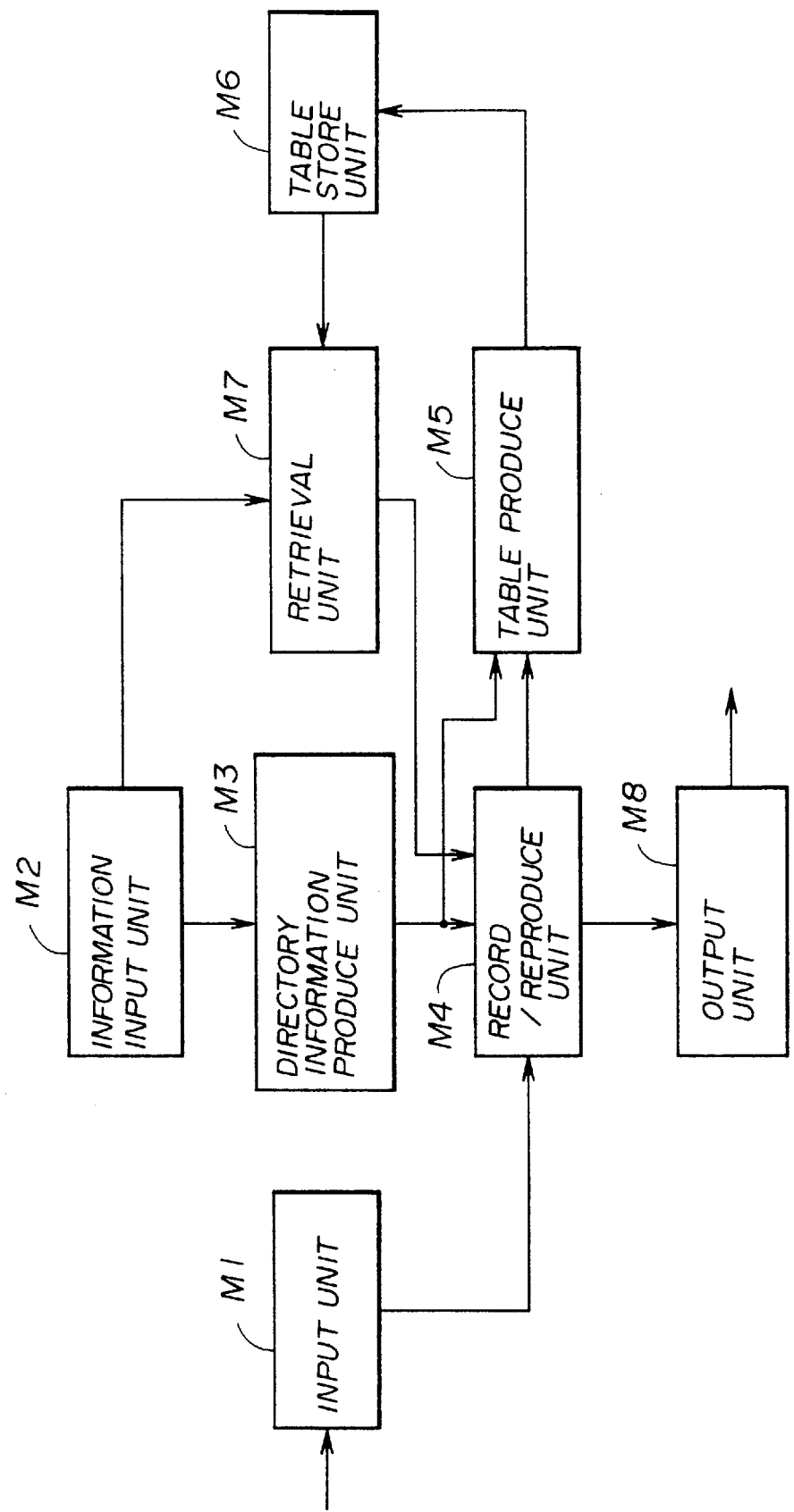
FIG. 8 shows a block diagram of the image filing apparatus according to the second embodiment of the present invention.

A principle block diagram of the image filing apparatus according to the second through fourth embodiments of the present invention will now be described with reference to FIG. 8.

An input unit M1 produces image data by converting an input analog video signal into digital data used as the image data.

An information input unit M2 inputs information for operation of the apparatus and information for identification of the input information concerning images.

A directory information producing unit M3 produces a directory information packet which includes the above information for identification and information for indicating a position where the image data is to be recorded in the recording medium.

A recording/reproducing unit M4 records in the recording medium and reproduces from the recording medium the plurality of image-data files corresponding to the image data input by the input unit M1 and the directory information packets corresponding to the image-data files, which directory information packets were produced by the directory information producing unit.

A table producing unit M5 produces a retrieval table (to be used for retrieving the stored information concerning images) by using the directory information packets.

A table storing unit M6 stores the retrieval table produced by the table producing unit M5.

A retrieval unit M7 retrieves the directory information packet corresponding to the desired image data in accordance with the input information input by the input unit M1 with reference to the retrieval table, and causes the recording/reproducing unit M4 to reproduce the desired image data.

An output unit M8 outputs an analog video signal by converting the image data read by the recording/reproducing unit M4 into the analog video signal.

The image filing apparatus according to the second through fourth embodiments of the present invention produces and stores the retrieval table. Thus, the directory information packets corresponding to the files of the desired image data can be selected by reference to the retrieval table and only the selected directory information packets have to be retrieved. It is thus not necessary to retrieve directory information packets corresponding to all the files of the image data. Thus, a speedy retrieval operation can be realized.

Figure 9:
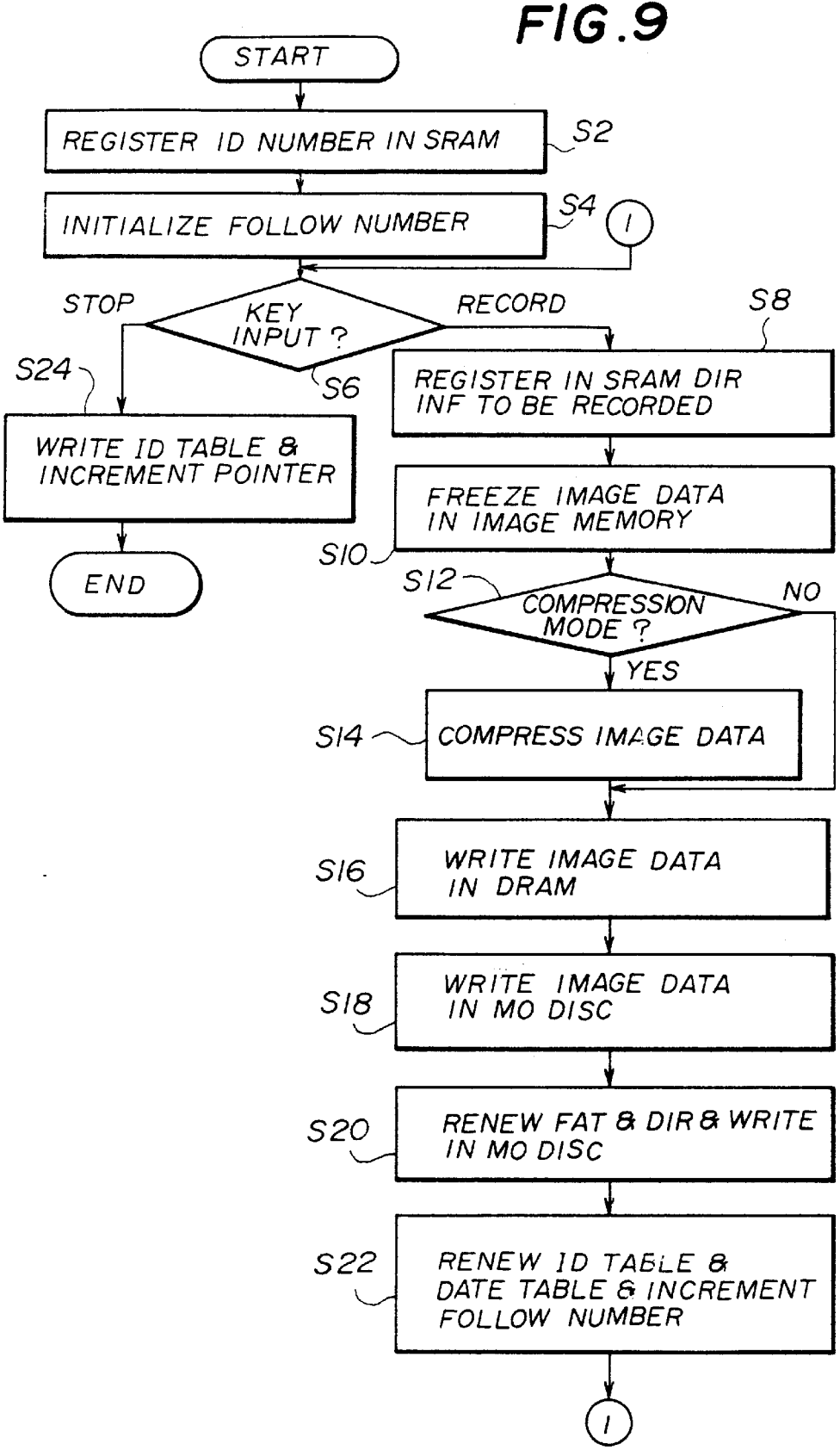
FIG. 9 shows an operation flow of a recording process in the image filing apparatus according to the second through fourth embodiments of the present invention.

The CPU 86 executes a recording process shown in FIG. 9 in the image filing apparatus according to the second through fourth embodiments of the present invention.

The CPU 86 registers the input patient ID number in the SRAM 88 in a step S2 (the term "step" will be hereinafter omitted so that the "step S2" will be simply expressed as "S2") the "follow number" stored in the SRAM 88 is initialized to be 1 in S4. Then, the contents of the key input from the remote control unit 97 is determined in S6. In a case where the key 36 is pressed, S8 then is executed and the directory information packet corresponding to the image to be input is registered in the SRAM 88, the packet including information such as the "follow number" of the input patient ID number, the recording date, and the recording time. Then, in S10, the image data output by the A/D converter 56 is written (frozen) in the input image memory 73. Then, it is determined in S12 whether or not the compression mode is specified. In a case where the compression mode is specified, the image data read from the input image memory 73 is compressed by the compression/expansion unit 75 in S12.

The compressed image data or the image data read from the input image memory 73 is then stored in the DRAM 91 in S16. Then, in S18, the stored image data is read from the DRAM 91, and is then transferred to and stored in the MO disc of the MO disc device 95. Then, in S20, the directory information packet corresponding to an image stored in the MO disc is replaced (renewed) by the directory information packet registered in the SRAM 88. In S20, further, information including the "FAT starting number of an image", the "file data size" (FIG. 6B), and the "real file size" (FIG. 6D) is written as a part of the new directory information packet. Further, the new directory information packet (DIR), and the FAT corresponding to the area where the image data was written are written in the MO disc of the MO disc device 95 so as to renew those originally written in the MO disc. Then, in S22, the table element corresponding to the image data newly written in the MO disc is added to the ID table stored in the SRAM 88. Further, in S22, if the table element corresponding the current date has not yet been included in the date table, a table element corresponding to the current date is added to the date table, or if the table element of the current date has been already included in the date table the directory last address of the table element of the current date is changed so as to renew the directory last address accordingly. Further, in S22, the "follow number" is incremented by 1, and then S6 is executed.

Thus, by repeating the above recording process, the plurality of image sheets shown in FIG. 7A are recorded in the MO disc of the MO disc device 95. Further, the CPU 86 produces in the SRAM 88 the ID table shown in FIG. 7B and the date table shown in FIG. 7C both to be used for retrieval operations by using the directory information packets stored in the DRAM 91.

Further, in a case where it is determined in S6 that the stop key 27 has been pressed, the recording process ends after a pointer position is incremented in S24, which pointer indicates a position where the current table element of the ID table is registered.

Figure 10:
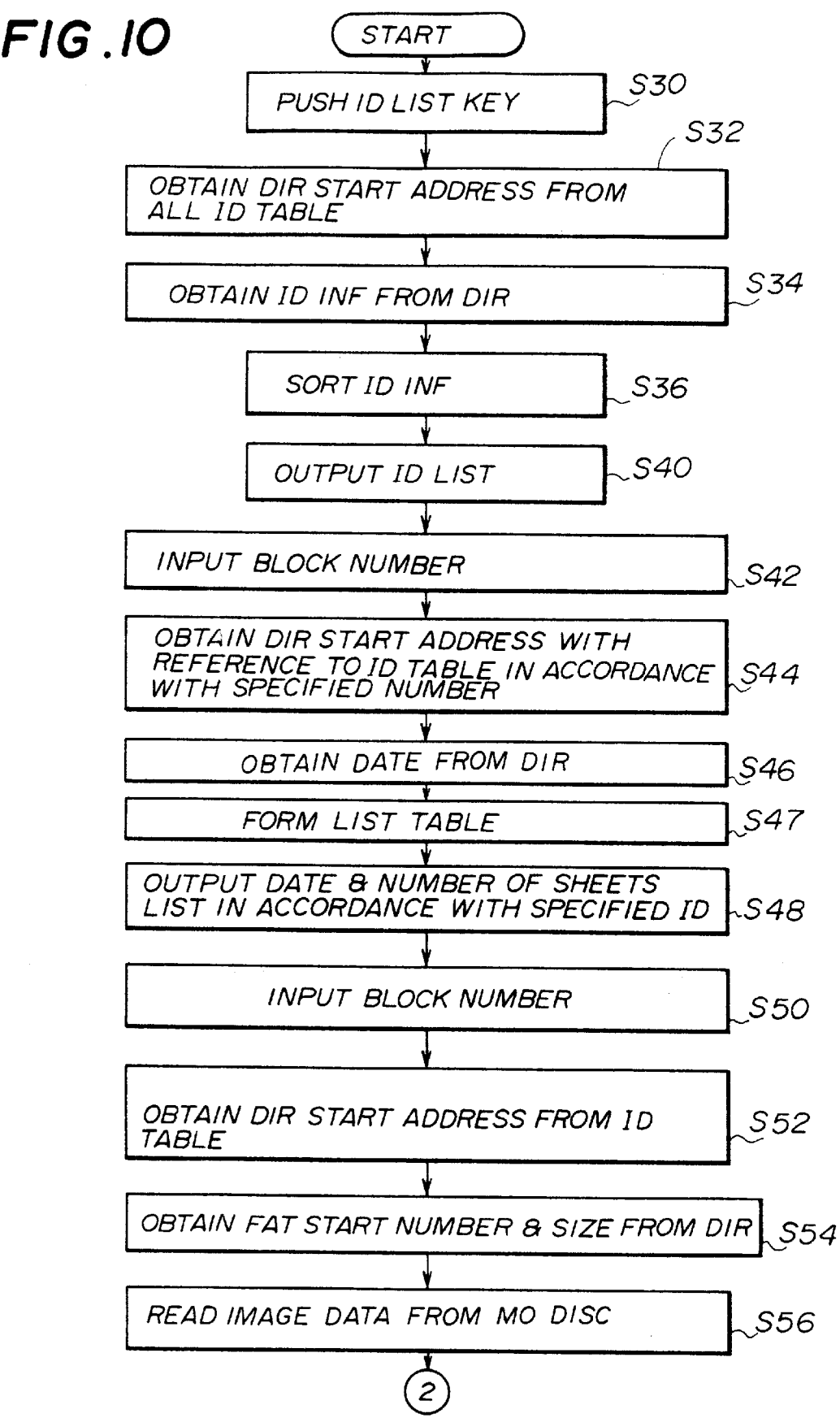
FIGS. 10 and 11 show an operation flow of an ID list retrieval process in the image filing apparatus according to the second through fourth embodiments of the present invention.

An operation flow of the ID list retrieval operation in the image filing apparatus according to the second through fourth embodiments of the present invention will now be described with reference to FIGS. 10 and 11. When the ID list key 31 is pressed by the operator in S30 of FIG. 10, the directory (DIR) starting addresses stated in all the table elements of the ID table are obtained in S32. The patient ID numbers are obtained in S34, which numbers have been stated in the directory information packets stored in the DRAM 91 and which packets have been specified by the obtained directory (DIR) starting addresses in S34. Then, the obtained patient ID numbers are sorted in S36 so as to be listed a sequence in which the patient numbers increase. Then, a list of the patient ID numbers accompanied by block numbers according to the sorted sequence is displayed in S40 as shown in FIG. 12A by means of the display controller 92.

The operator then searches the displayed list for a desired patient ID number, inputs the found patient ID number by specifying the corresponding block number in S42 and then presses the ID list key 31. Then, in S44, information of the directory starting address of each information packet and the corresponding "number of sheets" is obtained in S42, the information of the directory starting address and the "number of sheets" being stated in each of the table elements of the ID table, and the table elements having been retrieved in accordance with the patient ID numbers corresponding to the specified block number. Then, in S46, data information is obtained, which date information is stated in the directory information packets stored in the DRAM 91, the directory information packets having been obtained in accordance with the obtained directory starting addresses. Then, information concerning the obtained date and the "number of sheets" is stored in the SRAM 88, the stored information forming a table in S47, and the table being called a "list table". Then, the list table is displayed as shown in FIG. 12B in S48 by means of the display controller 92. (In the list table, the information of each "number of sheets" has been obtained in S44, and the information of each date has been obtained in S46.)

The operator then searches the displayed list table for a desired date, inputs a desired date, in S50, by specifying the block number corresponding to the desired date, and then presses the search key 34. Then, in S52, the directory starting addresses are obtained, which directory starting addresses are stated in the table elements retrieved from the ID table in accordance with the input block number. (Each of the elements of the list table is made to include information for indicating the table element of the ID table, from which table element the date has been derived in S44 and S45. Resulting from this derivation, the element of the list table is made to include the information for indicating the table element) Then, the "FAT starting numbers of images" and file data sizes are obtained in S54, which FAT starting numbers of images, and file data sizes are stated in the directory information packets stored in the DRAM 91, which directory information packets have been retrieved in accordance with the obtained directory starting addresses. Then, the image data is read from the MO disc of the MO disc device 95 and stored it in the DRAM 91 in S56, the image data having been specified by the obtained FAT starting numbers of images and the file data sizes.

Figure 11:
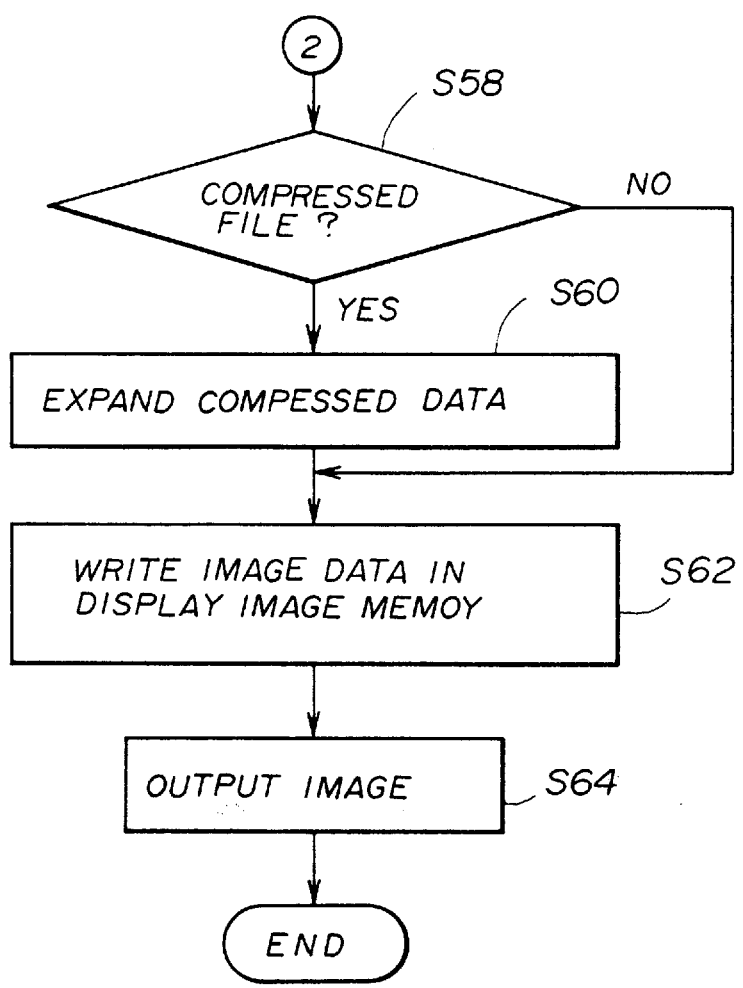

In S58 of FIG. 11, it is determined whether or not the stored image data was obtained as a result of compression, the determination is executed by referring the directory information packets referred to in S54. In a case where it is determined that the image data was obtained as a result of compression, the image data is expanded in S60 by means of the compression/expansion unit 75. The expanded image data or the image data which was stored in the DRAM 91 and then has been read is then written in the display image memory 74 in S62. Then, the image data stored in the display image memory 74 is read in order from the memory in S64. The read image data is then converted by the D/A converter 70 into the combined video signal comprising an analog signal and is then displayed on the monitor 43 in S64 after being output via the terminal 81.

Figure 13:
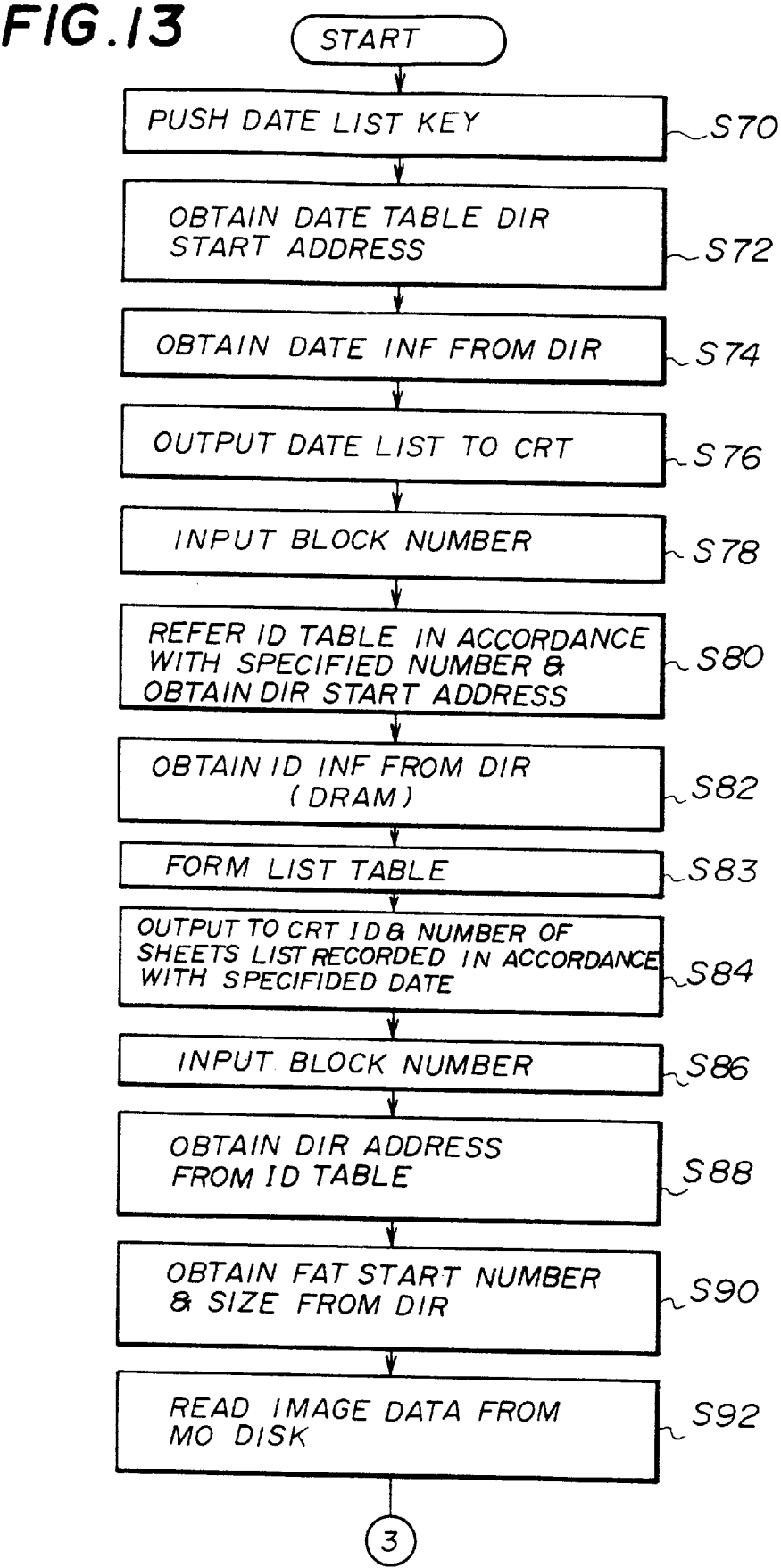
FIGS. 13 and 14 show an operation flow of a date list retrieval process in the image filing apparatus according to the second through fourth embodiments of the present invention.

An operation flow of the date list retrieval operation in the image filing apparatus according to the second through fourth embodiments of the present invention will now be described with reference to FIGS. 13 and 14. When the operator presses the date list key 32 in S70, the directory (DIR) starting addresses stated in all the table elements of the date table are obtained in S72. Information of dates is obtained in S74, which information is stated in the directory information packets stored in the DRAM 91, and which information packets have been retrieved in accordance with the obtained directory starting addresses. Then, a list of the obtained dates and associated block numbers, as shown in FIG. 15A, is displayed in S76 by means of the display controller 92.

The operator then searches the displayed list for a desired date, inputs the block number corresponding to the found desired date, and presses the date list key 32, in S78. Then, the directory starting address and the directory last address are obtained in S80, which addresses are stated in the table element of the date table, which table element have been referred to in accordance with the date corresponding to the input block number. Further in S80, the table elements of the ID table are obtained, which table elements comprise all table elements having directory starting addresses, starting with the obtained directory starting address stated in the table element of the date table and ending with the obtained directory last address stated in the table element of the date table. Further in S80, information concerning the directory starting addresses and the "number of sheets" is obtained, which information is stated in each of the obtained table elements of the ID table. Then, the patient ID numbers are obtained in S82, which numbers are stated in the directory information packets stored in the DRAM 91, which packets have been specified by the obtained directory starting addresses. Then, the information concerning each obtained patient ID number and each obtained "number of sheets" is stored in the SRAM 88, the stored information then forming a list in S83, the formed list being called a "list table". Then, in S84, the list table concerning each obtained patient ID number and each obtained "number of sheets is displayed being associated with block numbers, and the corresponding dates, as shown in FIG. 15B, by means of the display controller 92.

The operator then searches the displayed table list for a desired patient ID number, inputs the block number corresponding to the found patient ID number, and presses the search key 34, in S86. Then, the ID table is referred to in accordance with the input block number of the displayed list table. (Each of the elements of the list table is made to include information for indicating the table elements of the ID table, which elements concerning the date, which elements were referred to in S80. As a result of this reference, the element of the list table is made to include the information for indicating the table elements.) Then, the directory starting addresses stated in the reference table elements of the ID table are obtained. Then, the "FAT starting numbers of images" and file data sizes are obtained in S90, which FAT starting numbers of images and file data sizes are stated in the directory information packets stored in the DRAM 91, which directory information packets have been retrieved in accordance with the obtained directory starting addresses. Then, in S92, the image data is read from the MO disc of the MO disc device 95 and is stored in the DRAM 91, the image data having been specified by the obtained FAT starting numbers of images and the file data sizes.

Figure 14:
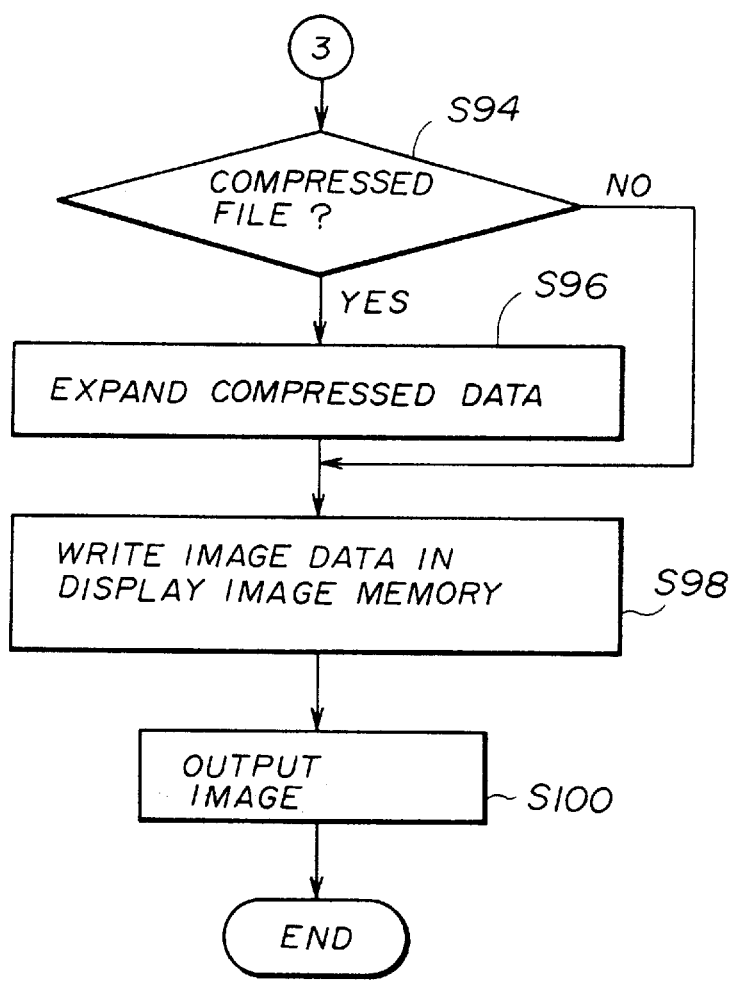

In S94 of FIG. 14, it is determined whether or not the stored image data was obtained as a result of compression, the determination is executed by referring to the directory information packets referred to in S90. If it is determined that the image data was obtained as a result of compression, the image data is expanded in S96 by means of the compression/expansion unit 75. The expanded image data or the image data which was stored in the DRAM 91 and then has been read is then written into the display image memory 74 in S98. Then, in S100, the image data stored in the display image memory 74 is read in appropriate order from the memory. The read image data is then converted by the D/A converter 70 into the combined video signal comprising an analog signal and is then displayed on the monitor 43 in S100 after output via the terminal 81.

Thus, in the image filing apparatus according to the second through fourth embodiments of the present invention, the ID table and the date table are stored in the SRAM 88. Thus, the retrieval operations can be executed by retrieving only the directory information packets concerning the images it is desired to retrieve by referring to the ID table or to the date table. It is thus not necessary to retrieve directory information packets concerning all images including images not concerning the desired images. Thus, speedy retrieval operations can be realized.

Further, the contents of the tables shown in FIGS. 12A, 12B. 15A and 15B can be displayed in a common monitor also used for causing display of images stored in the image storing area of FIG. 5. Thus, operation efficiency of the retrieval operations can be improved because an operation for changing of monitors can be eliminated, which changing of monitors may be necessary for causing display on both screens, one screen causing display of the tables and the other screen causing display of the image of the image storing area in turn.

The image filing apparatus according to the third embodiment of the present invention is further useful for solving the following problem.

The problem is that a remaining space of a recording capacity of the recording medium can not be known by the operator each time information is stored therein. The recording medium may comprise, for example, an optical disc which is used for storing information of a plurality of image sheets or it may comprise a recording medium used in a personal computer which is used for processing the directory information packets.

In the image filing apparatus according to the third embodiment of the present invention, the operator can know an information quantity of the images and an information quantity of the directory information packets which quantities can be further recorded in the recording medium (,these further-recordable information quantities corresponding to the respective remaining spaces of the recording capacities of the respective recording mediums).

A principle block diagram of the image filing apparatus according to the third embodiment of the present invention, will now be described with reference to FIG. 16.

An input unit M11 produces image data by converting an input analog video signal into digital data to be used as the image data.

An information input unit M12 inputs information for operation of the apparatus and information for identification of input information concerning images.

A directory information producing unit M13 produces a directory information packet that includes the above information for identification of the input information concerning images and includes information for indicating a position where the image data is to be recorded in the recording medium.

A recording/reproducing unit M14 records in the recording medium and reproduces from the recording medium the plurality of image-data files corresponding to the image data input by the input unit M1 and records in the recording medium and reproduces from the recording medium the directory information packets corresponding to the image-data files, which directory information packets were produced by the directory information producing unit.

A usage ratio deriving unit M15 calculates, based on the directory information packets, a usage ratio, that is, it calculates how much of the memory capacity of the directory storing area is used, and calculates another usage ratio, that is, it calculates how much of memory capacity of the image storing area in the recording medium is used; the unit M15 also determines that the greater usage ratio of the calculated usage ratios is to be displayed.

A character producing unit M16 produces an analog video signal for causing display of the usage ratio.

An output unit M17 outputs an analog video signal by converting into the analog video signal the image data read by the recording/reproducing unit M14.

A mixing unit M18 mixes the analog video signal for causing display of the usage ratio with the analog video signal output by the output unit M17.

In the image filing apparatus according to the third embodiment of the present invention, after a certain quantity has been stored in the MO disc, the operator can be informed, by causing display of the greater usage ratio, how many images and directory information packets can be additionally stored in the MO disc each time the MO disc is used to store information.

Figure 17:
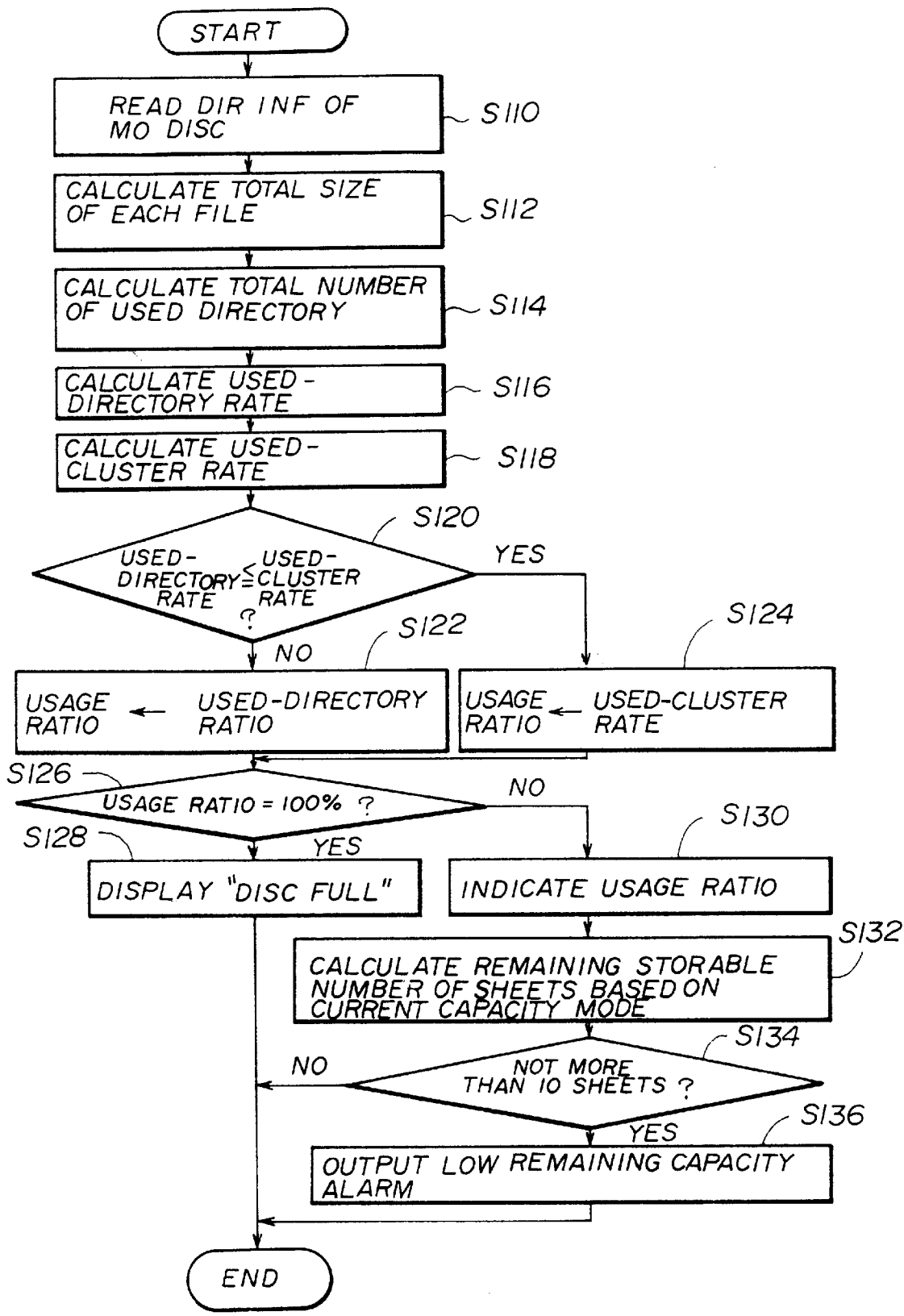
FIGS. 17 and 18 show operation flows of a remaining value display process in the image filing apparatus according to the third embodiment of the present invention.

In the image filing apparatus according to the third embodiment of the present invention, when the MO disc device 95 recognizes that the MO disc has been loaded therein, the CPU 86 executes a remaining quantity display process as shown in FIG. 17.

All the directory information packets are read from the MO disc and then, in S110, they are stored in the DRAM 91. Then, in S112, a result (total size) of adding all the file data sizes (numbers of clusters) of the directory information packets stored in the DRAM 91 is derived by calculation and the result is stored in the SRAM 88. Then, in S114, a total number of elements of the directory is calculated and then is stored in the SRAM 88.

A rate of the total number of elements stored in the directory to the maximum number (for example, 5000) of elements storable in the directory is then calculated in S116, the maximum number being a number of elements capable of being stored in the directory storing area in the MO disc shown in FIG. 5, which rate will be called the used-directory rate. Another rate: total size to maximum cluster number (for example, 30876) is then calculated in S118, which maximum cluster number is a number of clusters capable of being stored in the image storing area in FIG. 5, this other rate will be called the used-cluster rate. A comparison is executed in S120, which comparison compares the value of the used-directory rate with the value of the used-cluster rate. Then, as a result of the comparison, the greater amount of the used-directory rate and the used-cluster rate is then determined to be the usage ratio in S122 or S124.

Then, it is determined in S126 whether or not the usage ratio has reached 100%. In a case where it is determined that the usage ratio has reached 100%, a term "DISC FULL" is then displayed on the monitor, in S128, by using the corresponding characters by means of the display controller 92. The remaining memory display process is then finished. In other a case where it is determined that the usage ratio has not yet reached 100%, the value of the area rate is displayed on the monitor, in S130, by using the corresponding characters (figures) by means of the display controller 92. Then, a remaining storable number of sheets is calculated in S132, which calculation is executed by calculation based on the current capacity mode. Information of the current capacity mode is stored in the SRAM 88, which current capacity mode was selected from among the large capacity mode (mode 4), the standard mode (mode 3), the semi-high-resolution mode (mode 2), and the non-compression mode (mode 1). A number of clusters for storing image data corresponding to a sheet of image, was predetermined for each of the four capacity modes. The S132 calculation of the remaining storable number of sheets is executed so that, in an example of the comparison of S120 resulting in the used-cluster rate being determined as the usage ratio, a number of remaining clusters is calculated by subtracting the used number from the maximum number (=30876) of clusters, and the obtained number remaining clusters is then divided by the number of clusters corresponding to the current capacity mode, which number of clusters corresponding to the current capacity mode is required for storing image data corresponding to a sheet of image.

Then, it is determined in S134 whether or not the calculated remaining storable number of sheets is more than 10. If the remaining storable number of sheets is more than 10, the remaining quantity display process ends. If the reminding storable number of sheets is not more than 10, the low remaining capacity alarm indicator LED 37 is lit in S136 so as to cause the operator to become aware that a number of image sheets which can be further stored is small. Then, the remaining quantity display process ends.

When data is stored in the image filing apparatus according to the third embodiment of the present invention, the following operations are executed. The operator inputs the patient ID by means of ten-key keyboard 22 of the remote control unit 97 and then presses the ID storing key 35. Further, the operator presses the capacity selecting key 30 so as to select the capacity mode from among the large capacity mode (mode 4), the standard mode (mode 3), the semi-high-resolution mode (mode 2), and the non-compression mode (mode 1).

Figure 18:
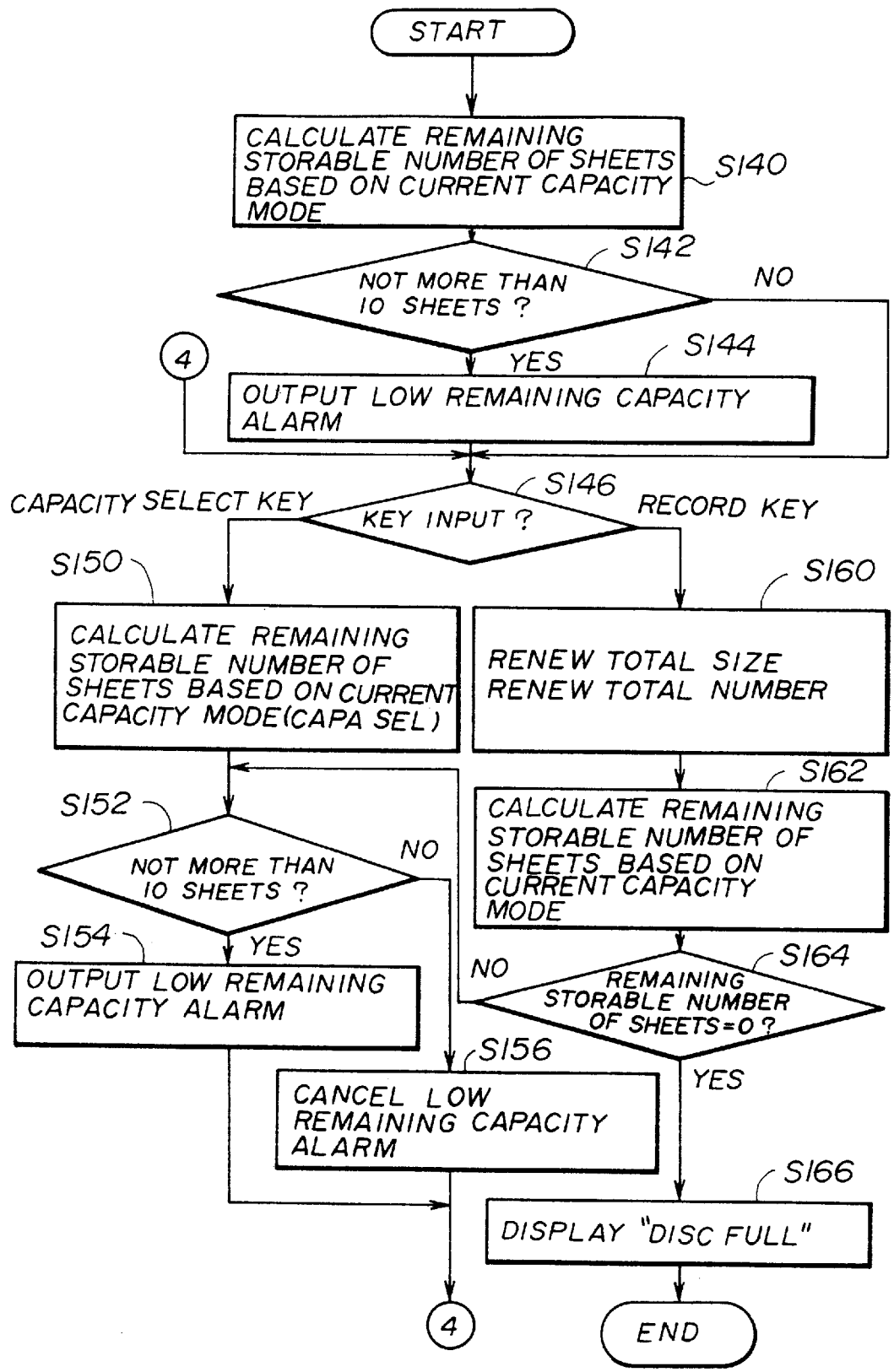

The above key operations result in the CPU 86 producing the character video signal for causing display of the input patient ID and the capacity mode, the produced character video signal being then input to the character mixing unit 79, and the monitor 43 then causing display of the input patient ID and the capacity mode. Then, the remaining quantity display process shown in FIG. 18 is executed. The remaining storable number of sheets (how many sheets can be stored) is calculated based on the current capacity mode in S140 by an operation similar to that in S132. It is then determined in S142 whether or not the calculated remaining storable number of sheets is more than 10. Only in a case where the remaining storable number of sheets is not more than 10 sheets, the "low remaining capacity alarm indicator LED 37" is lit in S144.

Then it is determined in S146 what the key input is. In a case where the current capacity mode has been changed by means of the capacity selection key 30, the remaining storable number of sheets is calculated based on the revised capacity mode in S150 by an operation similar to that in S132. Then it is determined in S152 whether or not the calculated remaining storable number of sheets is not more than 10. If the remaining storable number of sheets is not more than 10 sheets, the "low remaining capacity alarm indicator LED 37" is lit in S154. If the remaining storable number of sheets is more than 10 sheets, the low remaining capacity alarm indicator LED 37 is switched off in S156, and then the S146 is executed again.

If it is determined in S146 that the record key 36 has been pressed, the above total size and the above total number are then revised in S160 the revision being based on the number of image sheets and on the file data size (a number of clusters) additionally recorded by means of the pressing of the record key 36 and being based on the directory information packet which has been additionally recorded together with the recording of the additional image sheets and file data size. Then, the remaining storable number of sheets is calculated based on the current capacity mode in S162 by an operation similar to that in S132. It is then determined in S164 whether or not the calculated remaining storable number of sheets is 0. If the remaining storable number of sheets is not 0, S152 is executed. If the remaining storable number of sheets is 0, the term "DISC FULL" is displayed on the monitor, in S166, by means of the display controller 92, by the corresponding characters. Then the remaining quantity display process ends.

Thus, the greater one from among the used-cluster rate and the used-directory rate is displayed on the monitor in the image filing apparatus according to the third embodiment of the present invention. Thus, the operator can be informed concerning the quantity of images and directory information that can be further stored in the MO disc.

Further, the occurrence of the low remaining capacity alarm resulting from the remaining storable number of sheets being 10 or less urges the operator to replace the MO disc in the MO disc device 95 with a new MO disc before the capacity of the MO disc is exhausted. This results in the image filing apparatus being easy to use.

The image filing apparatus according to the fourth embodiment is further useful for solving the following problem. In an example of utilizing an image filing apparatus, a diagnosis using a supersonic diagnosis apparatus results in recording, for example, several image sheets for a patient. In this case, because no relationship is made between the several image sheets recorded when the images were recorded in a database, a retrieval operation may be troublesome. In a case where the several image sheets recorded for each diagnosis are successively recorded in the recording medium from the first recorded image to the last recorded image, retrieval of the first recorded image facilitates retrieval by the operator of the remaining images of the several sheets of the image. However, retrieval of the first recorded image requires specification by the operator as to the date and time when the first recorded image, which specification is not always easy to do.

In the image filing apparatus according to the fourth embodiment of the present invention, the first image of the several image sheets recorded for each diagnosis can be retrieved.

Figure 19:
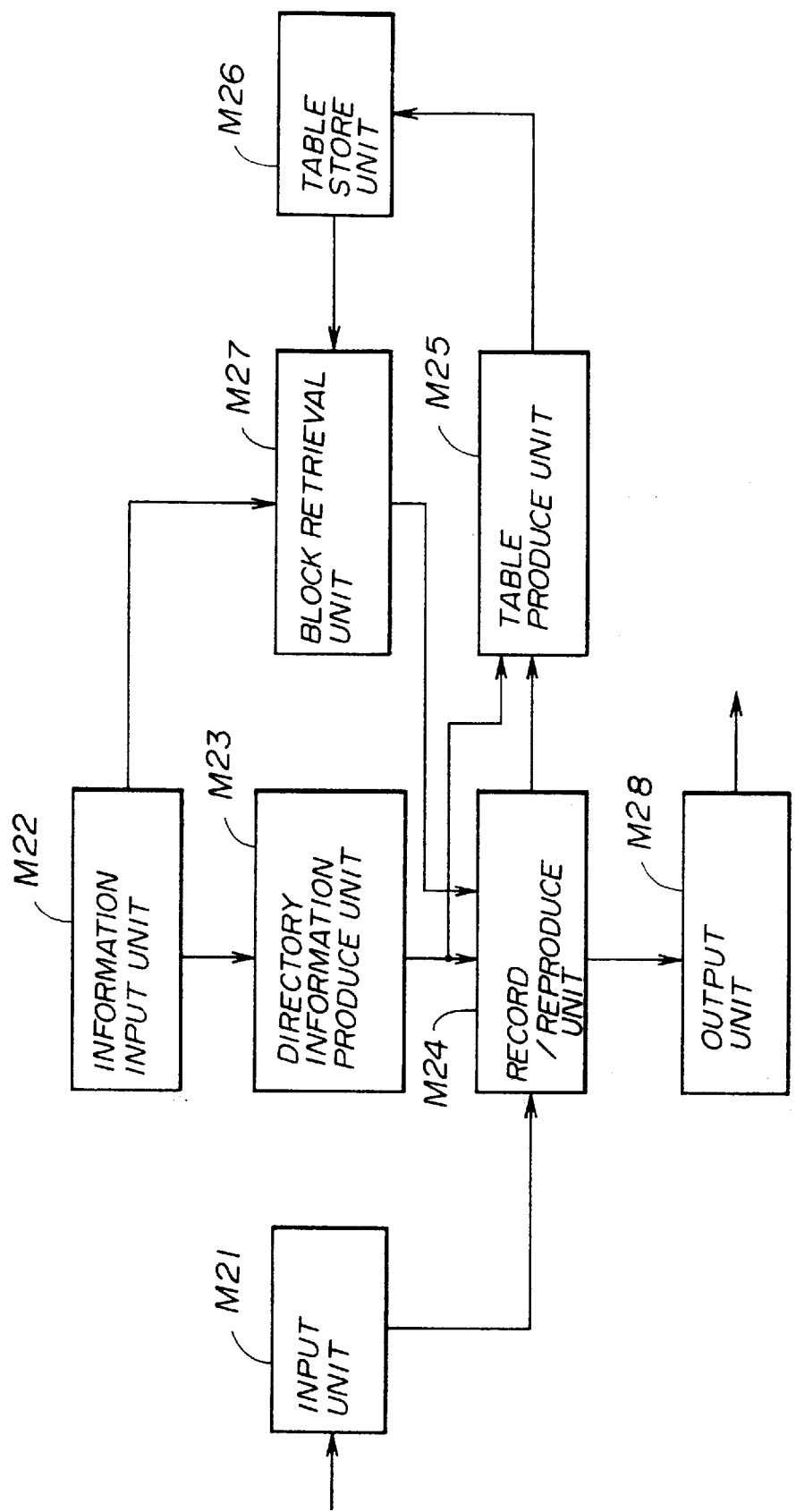
FIG. 19 shows a block diagram of the image filing apparatus according to the fourth embodiment of the present invention.

A principle block diagram of the image filing apparatus according to the second through fourth embodiments of the present invention will be described with reference to FIG. 19.

An input unit M21 produces image data by converting an input analog video signal into digital data to be used as the image data.

An information input unit M22 inputs information for operation of the apparatus and information for identification of input information concerning images.

A directory information producing unit M23 produces a directory information packet that includes the above information for identification input information concerning images and includes information for indicating a position where the image data is to be recorded in the recording medium.

A recording/reproducing unit M24 records in the recording medium and reproduces from the recording medium the plurality of image-data files corresponding to the image data input by the input unit M1 as well as the directory information packets corresponding to the image-data files, which directory information packets were produced by the directory information producing unit.

A table producing unit M25 collects a plurality of images corresponding to the image-data files so as to produce blocks of the images by using the directory information packets corresponding to the image-data files, each of which produced blocks comprises images having mutual relationships. The table producing unit M25 then produces a table in which a position for each of the blocks is stated, which position comprises a position where the directory information packet corresponding to the first recorded image of the images is recorded in the recording medium.

A table storing unit M26 stores the table produced by the table producing unit M25.

When the operator intends to retrieve a desired image, a block retrieval unit M27 retrieves, with reference to the table produced by the table producing unit M25, the directory information packet corresponding to the first recorded image of the images constituting the block including a desired image, the retrieval being in accordance with the input information input by means of the input unit M21; the unit M27 then causes the recording/reproducing unit M24 to reproduce the first recorded image.

An output unit M28 outputs an analog video signal by converting the image data read by the recording/reproducing unit M4 into the analog video signal.

In the image filing apparatus according to the fourth embodiment of the present invention, usage of the reference table results in obtaining the directory information packet corresponding to the first image of the block of images. Thus, the first image is retrieved and is then reproduced.

In the image filing apparatus according to the fourth embodiment of the present invention, there may be a case where a patient is treated in a diagnosis operation utilizing the image filing apparatus, the patient not yet having a corresponding patient ID number (for instance in a case where the patient must be treated urgently). In this case, an ID recording key 35 is pressed without first inputting a patient ID when the images concerning the patient are displayed on the monitor and the images are thus input to the image filing apparatus. In this case, the CPU 86 determines that the patient ID "9" is to be assigned to the patient so as to register the images.

When a diagnosis operation utilizes a supersonic diagnosis apparatus, many, for example more than ten sheets, image sheets are recorded for each diagnosis operation the plurality of sheets constitutes a block. The image sheets of the plurality of sheets correspond to a plurality of portions of a part of a human body. Normally, a sequence in which the plurality of portions of each part of a human body are examined is predetermined. Thus, it is preferable, in many cases, to reproduce and view the plurality of image sheets in the same order in which they are recorded. Thus, a function of retrieval of the first recorded image of the block of images is needed.

Figure 20:
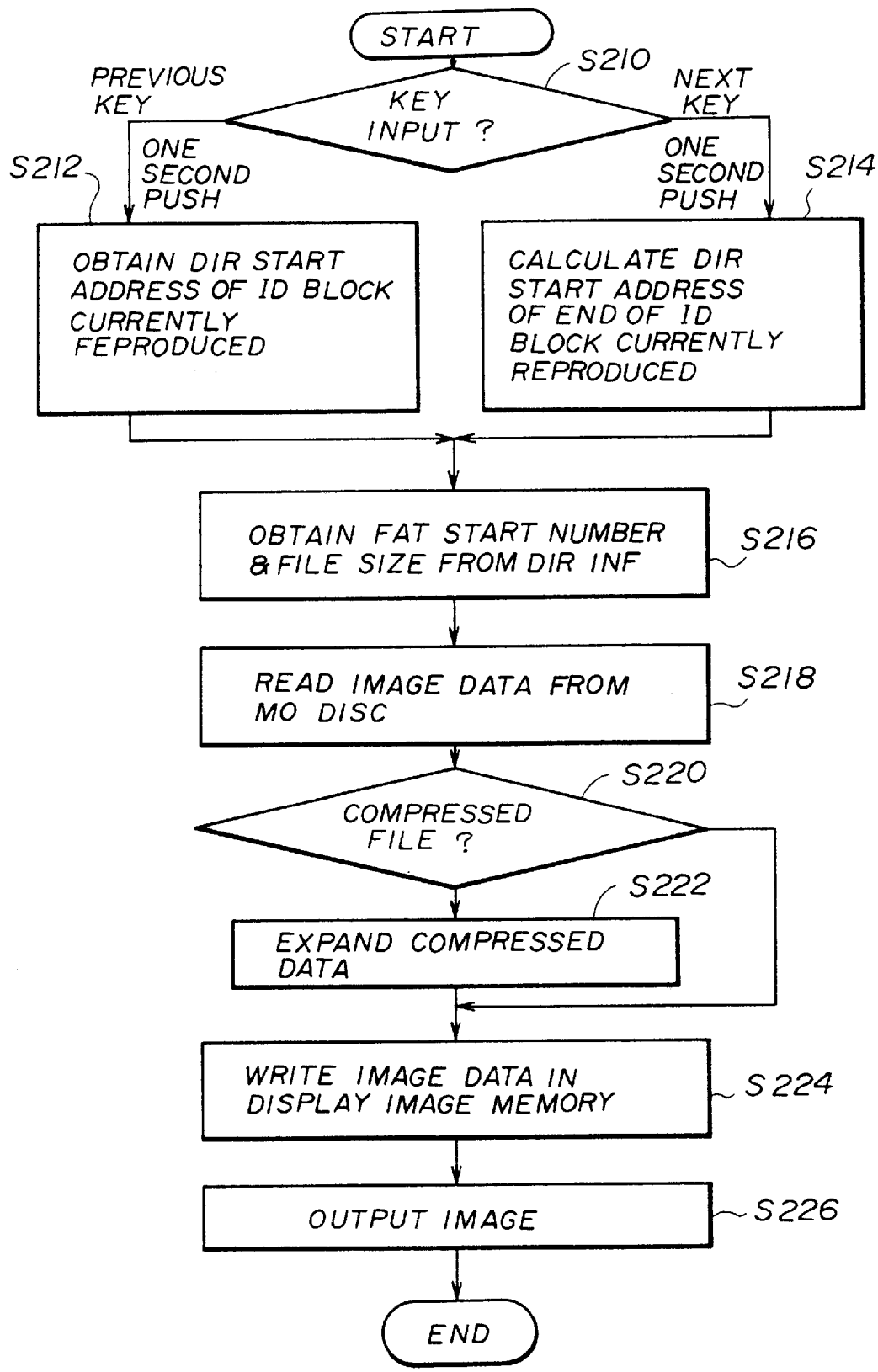
FIG. 20 shows an operation flow of a block searching process in the image filing apparatus according to the fourth embodiment of the present invention.

An operation flow of a block search process in the image filing apparatus according to the fourth embodiment of the present invention will now be described with reference to FIG. 20. The block search process is used for retrieving the first image of the block of images.

It is determined in S210 which key input is executed in the remote control unit 97. In a case where pressing of the "previous" key 25 is continued by the operator for more than one second, S212 is executed. In a case where pressing of the "next" key 26 is continued by the operator for more than one second, S214 is executed.

The directory starting address is obtained in S212 from the table element of the ID table stored in the SRAM 88, which table element corresponds to the block of images which block includes an image currently displayed on the monitor. On the other hand, an address (in the DRAM 91) of the directory information packet is calculated in S214, which directory information packet corresponds to an image that comprises the last (end) image of the block of images including an image currently displayed on the monitor, the calculation being effected by referring to the directory starting addresses from the table elements that correspond to the block including an image currently displayed on the monitor. The directory information packet corresponding to an image-data file storing one sheet of an image is always 64 bytes. Thus, the above derivation does not require a long time to be obtained.

The directory information packet is referred to in S216 in accordance with the directory starting address obtained in S212 or with the address calculated in S214, and then the FAT starting number and the file data size are obtained from the reference packet. Then, in S218, image data stored as the image-data file specified by the obtained FAT starting number and by the file data size is read and stored in the DRAM 91, which image data corresponds to the image data at the start of the block or the image data at the end of the block.

It is then determined in S220 in accordance with the directory information packet referred to in S216 whether or not the read and stored image data was obtained as a result of compression. If the image data was obtained as the result of compression, the image data is then expanded in S222 by means of the compression/expansion unit 75, and the image data is then written in the display image memory 74 in S224, which image data has been expanded in S222 or stored in the DRAM 91 in S218. Then, the written image data is read in order from the display image memory 74, and is converted into an analog signal to be used as the combined video signal by means of the D/A converter 70. The analog signal is then output, in S226, via the terminal 81, and the corresponding information is then displayed on the monitor 43.

An operation of changing the patient ID number stated in the directory information packet, which patient ID number was registered as "9" (as mentioned above) in an urgent patient's case will now be described.

After a patient ID number for an urgent patient has been determined, a renumbering process having an operation flow as shown in FIG. 21 is executed in the image filing apparatus according to the fourth embodiment of the present invention.

In FIG. 21, in S230, the image is retrieved and then reproduced, the image being that concerning the patient ID to be changed. The retrieval may be executed by applying a retrieval operation from among the directory retrieval operation, the ID list retrieval operation, and the date list retrieval operation. Then, in S232, the operator inputs a new patient ID number with which number the original patient ID number stated in the directory information packets is replaced, by means of the ten-key keyboard 22, and the operator then presses the ID EDIT key 21 in S234.

The above operations result in the CPU 86 replacing, in S236, the original patient ID number by the input new patient ID number in the DRAM 91, which directory information packet corresponds to the image currently displayed on the monitor. The CPU then, in S236, further replaces the "follow number" stated in the directory information packet with 1. Further in S236, the patient ID numbers stated in the corresponding directory information packets are replaced by the input patient ID number and the "follow numbers" stated in the directory information packets are replaced so that the "follow numbers" become sequential, that is: 2, 3, 4, . . . , the directory information packets corresponding to images included in the block that includes the image currently being displayed on the monitor, and which images follow the currently displayed image. The images included in the block concern a common patient ID number and a common date.

The directory information packets having information that has been changed in the DRAM 91 in S236 are then transferred to the MO disc device 95 and then the corresponding directory information packets stored in the MO disc are replaced by the transferred packets in S238. Then, in S240, the patient ID number stated in the table element of the ID table, which number corresponds to the new patient ID number, is replaced by the new patient ID number in the SRAM 88. Then, the renumbering process ends.

In this renumbering process, there may be an example of cases where the block has 10 image sheets concerning a common patient ID number and a common date. In this case, each of the images has the respective "follow number" from among the "follow numbers" from 1 to 10. If the renumbering process is executed when the image having the "follow number" 5 is being displayed on the monitor, the patient ID numbers and the "follow number" of only the images having the "follow numbers" 5 through 10 are replaced by the new patient ID number and by the new "follow numbers" from 1 to 6 respectively. These 6 images having the new patient ID number and the new "follow numbers" 1 to 6 constitute a new block different from the block comprising the 4 images having the original common patient ID number and the original "follow numbers" 1 through 4. Thus, a new table element is then added to the ID table correspondingly to the addition of the new block.

In the image filing apparatus according to the fourth embodiment of the present invention, a series of images can be managed by utilizing the ID table, which series of images were recorded for a specific patient and for a corresponding diagnosis, that is, the series of images have mutual relationships and constitute a block. Thus, by referring to the ID table, the directory information packet corresponding to the first image of each block of images can be obtained, and thus the first image can be reproduced easily. This results in that the remaining images of the series of images can be successively reproduced easily.

Further, the present invention is not limited to the above described embodiments, and variations and modifications may be made without departing from the scope of the present invention.

What is claimed is:

1. Digital-data write/read apparatus comprising:
   a disc for writing thereto/reading therefrom data, with the data stored in said disc being arranged in such a manner that said data defines a plurality of sectors/clusters of data, the recording area of said disc comprising a directory information region for storing directory information therein and an actual data region for storing data files therein, the regions being positionally and functionally separated from one another, said directory information comprising file name records, each of which comprises a file name, file production data/time, information for pointing the position of the file in said actual-data region, the file size and identification information;
   identification information inputting means for inputting the identification information; and
   data processing means for inputting/outputting and managing the data constituting the data files, said means comprising a microprocessor, first information storage means for storing therein a first type of information obtained from said disc, second information storage means for storing therein a second type of information produced from said first type of information and instruction means for receiving instructions from an operator and then giving said instructions to said microprocessor, wherein said second type of information comprises an identification-information retrieval table information using said identification information which comprises matters different from matters indicating positions on said disc.

2. The digital data write/read apparatus according to claim 1, wherein, said first type of information comprises said directory information stored in said directory information region of said disc; and said microprocessor comprises retrieval table production means for producing retrieval-table information as said second type of information, to be used for the data-file retrieval, using said directory information stored in said first information storage.

3. The digital-data write/read apparatus according to claim 2, wherein said second type of information includes identification-information retrieval table information having said identification information listed therein, in the order determined based on the contents of said identification information, together with information indicating the corresponding addresses in said directory information region.

4. The digital-data write/read apparatus according to claim 2, wherein said second type of information includes data retrieval table information having said identification numbers and serial numbers listed therein, in the order determined based on the respective file production date/time included in said directory information first and then based on the contents of said identification numbers and serial numbers, together with information indicating the corresponding addresses in said directory information region.

5. The digital-data write/read apparatus according to claim 1, wherein, said identification information comprises:

an identification number which is arbitrarily specified; and a serial number which is incremented file by file as long as the files are included in the same block and initialized when the file is included in a block different from the block in which preceding files are included.

6. The digital-data write/read apparatus according to claim 1, further comprising:

first unused capacity calculating means for calculating the unused capacity ratio in said directory information region;

second unused capacity calculating means for calculating the unused capacity ratio in said actual data information region;

first determining means for determining which of the unused capacity ratios obtained by said first and second unused capacity calculating means is smaller;

second determining means for determining whether or not the unused capacity ratio determined by said first determining means is less than a predetermined value; and warning means for warning an operator if said second determining means determines that the unused capacity ratio determined by said first determining means is less than the predetermined value.

7. The digital-data read/write apparatus according to claim 1, wherein:

the sectors/clusters constituting said file allocation table region being provided for said data files to be stored in said actual data region and either subsequent-sector/cluster-number information or end-of-file information being stored in each sector/cluster of said file allocation table region; and each of said file name records further comprises an extension code indicating the file type, and said information for pointing the position of the file comprises the file start number indicating the file start sector/cluster number in said actual data region.

8. The digital-data write/read apparatus according to claim 1 wherein said identification information inputting means includes a remote control unit for operator entry of input directory data into said apparatus for producing or editing a file and for searching for image data files, display means for providing a video display of said input directory data, and image memory means for storing said input directory data as image data from said display means wherein said microprocessor identifies a storage location in said first information storage means for said image data, writes file code information at said storage location for said image data and transfers the stored information at said storage location inclusive of said file code information to said disk for writing said transferred information into said directory information region and actual data region of said disk.

9. Digital-data write/read apparatus comprising:

a disc for writing thereto/reading therefrom data, with the data stored in said disc being arranged in such a manner that said data defines a plurality of sectors/clusters of data, the recording area of said disc comprising a directory information region for storing directory information therein and an actual data region for storing data files therein, the regions being positionally and functionally separated from one another, said directory information comprising file name records, each of which comprises a file name, file production data/time, information for pointing the position of the file in said actual-data region, the file size and identification information;

identification information inputting means for inputting the identification information; and data processing means for inputting/outputting and managing the data constituting the data files, said means comprising a microprocessor, first information storage means for storing therein a first type of information obtained from said disc, second information storage means for storing therein a second type of information produced from said first type of information and instruction means for receiving instructions from an operator and then giving said instructions to said microprocessor, wherein said second type of information comprises identification-information, said identification information comprising a plurality of identification-information pieces, each piece of said plurality of identification-information pieces being relevant to a respective file of said date files, and said plurality of identification-information pieces being those such that contents of one piece of said plurality of identification-information pieces are allowed to be the same as contents of another piece of said plurality of identification-information pieces.

10. The digital-data write/read apparatus according to claim 9 wherein said identification information inputting means includes a remote control unit for operator entry of input directory data into said apparatus for producing or editing a file and for searching for image data files, display means for providing a video display of said input directory data, and image memory means for storing said input directory data as image data from said display means wherein said microprocessor identifies a storage location in said first information storage means for said image data, writes file code information at said storage location for said image data and transfers the stored information at said storage location inclusive of said file code information to said disk for writing said transferred information into said directory information region and actual data region of said disk.

* * * * *